(12) United States Patent
Le

(10) Patent No.: US 6,608,942 B1
(45) Date of Patent: Aug. 19, 2003

(54) METHOD FOR SMOOTHING JAGGED EDGES IN DIGITAL IMAGES

(75) Inventor: Delphine Anh Dao Le, Drummoyne (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,403

(22) Filed: Jan. 12, 1999

(30) Foreign Application Priority Data

Jan. 12, 1998 (AU) .............................................. PP1284

(51) Int. Cl.⁷ ................................................ G06K 9/64
(52) U.S. Cl. ...................................... 382/279; 382/199
(58) Field of Search .......................... 382/279, 276–278, 382/280–281, 283, 199, 266, 269

(56) References Cited

U.S. PATENT DOCUMENTS

| | | | | |
|---|---|---|---|---|
| 5,131,057 A | * | 7/1992 | Walowit ....................... | 382/41 |
| 5,218,350 A | * | 6/1993 | Bollman ....................... | 340/723 |
| 5,293,579 A | | 3/1994 | Stockholm .................... | 382/22 |
| 5,396,584 A | | 3/1995 | Lee et al. ..................... | 395/132 |
| 5,657,430 A | | 8/1997 | Smith et al. .................. | 395/102 |
| 5,771,107 A | * | 6/1998 | Fujimoto et al. ............. | 358/453 |
| 5,818,953 A | * | 10/1998 | Queisser et al. ............. | 382/110 |
| 5,844,614 A | * | 12/1998 | Chong et al. ................. | 348/420 |

FOREIGN PATENT DOCUMENTS

| | | | | |
|---|---|---|---|---|
| EP | 0584966 | 3/1994 | .......... | G06K/15/02 |
| EP | 0809207 | 11/1997 | .......... | G06K/15/12 |

\* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

A method of smoothing jagged edges in graphical data. The method detects one or more edge of a selected pixel in the graphical data, dependent upon intensities of the selected pixel and another pixel surrounding a respective site of one or more edges and predetermied gradients of at least the selected pixel and the respective site surrounding the pixel. An adapted convolution mask is applied to the selected pixel and a predetermined neighborhood of pixels containing the selected pixel. The coefficient values of the convolution mask are dependent upon one or more detected edges.

84 Claims, 30 Drawing Sheets

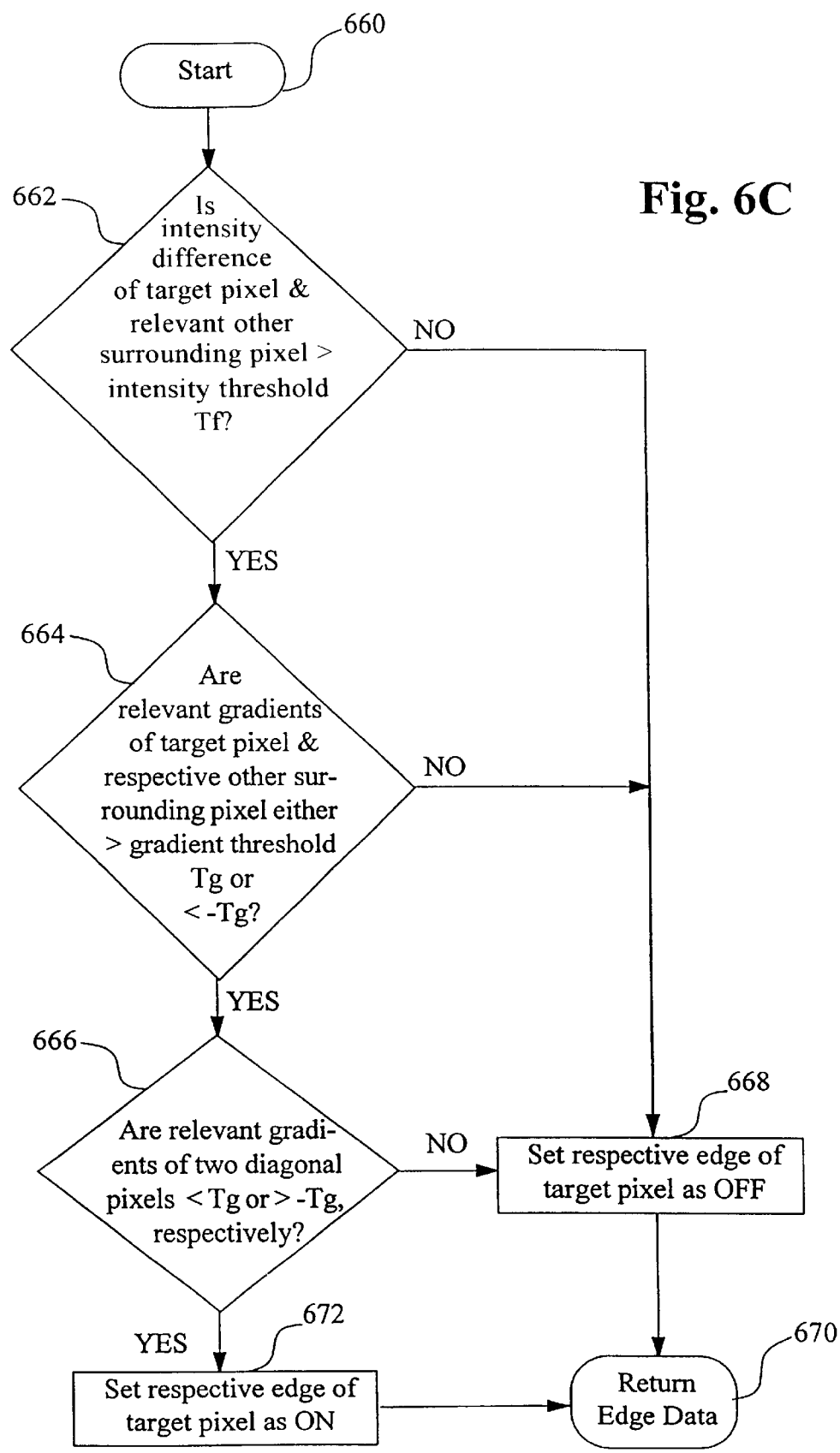

1050

JUNETは全体的管理者（j
インの管理者の集合体（postmas
上位ドメインの管理者の両者に
て全員が責任を負っているわけ
か の大学が運営しているとか書
れは間違いです。前者は根も葉
しかに一部の大学はJUNETの
ているといえるかもしれません

Fig. 15A

JUNETは全体的管理者（j
インの管理者の集合体（postmas
上位ドメインの管理者の両者に
て全員が責任を負っているわけ
か の大学が運営しているとか書
れは間違いです。前者は根も葉
しかに一部の大学はJUNETの
ているといえるかもしれません

Fig. 15B

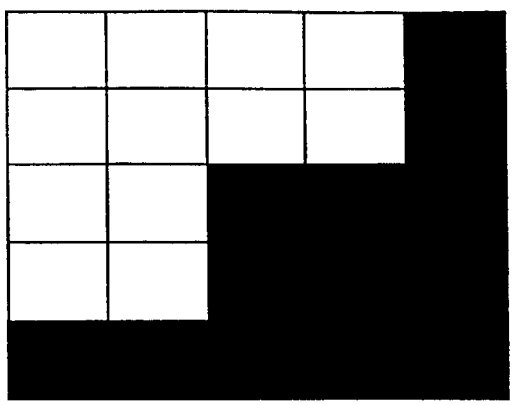
Fig. 22A
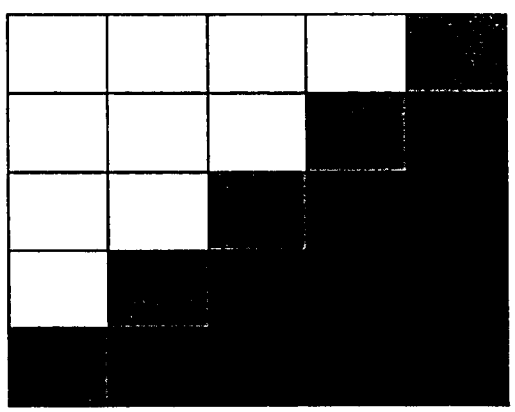
Fig. 22B
| 0 | 0 | 0 | 0 | + |
|---|---|---|---|---|
| 0 | 0 | 0 | - | 0 |
| 0 | 0 | + | 0 | 0 |
| 0 | - | 0 | 0 | 0 |
| + | 0 | 0 | 0 | 0 |
Fig. 22C

METHOD FOR SMOOTHING JAGGED EDGES IN DIGITAL IMAGES

The present invention relates to a method and apparatus for the directional smoothing of jagged edges in grey scale or colour images, in particular for text or graphics or any thin features.

BACKGROUND

Images represented in a pixel-based display often suffer from a staircase effect apparent in oblique lines and curves. This can adversely affect text readability, and especially the readability of small fonts applied to text. When an image is displayed at a higher resolution than the resolution with which it was generated, irregular edges can appear more pronounced.

For example, a ferro-electric liquid crystal display (FLCD) panel is capable of displaying text and natural image data at a standard screen resolution of 90 pixels per inch with a colour range of 4096 distinct colours. The panel is also capable of doubling the resolution with a consequently more limited colour range. Thus, it is possible to take advantage of the increased resolution to make text easier to read.

A number of conventional text enhancement systems rely on identifying predetermined patterns or features before modifying an image. For example, they modify the bitmap or pixel map depending on the positional relationships of background and foreground (text) pixels. This approach lacks generality and may not be able to handle exotic characters or particular graphics. Such a conventional technique assumes that the input data contains only text information. Alternatively, such a technique assumes that zone segmentation has previously discriminated between text data and natural image information. Moreover, the colour of the background and the foreground has to be known. Thus, such techniques are disadvantageous in that it is difficult to apply such techniques to complex images (eg., multiple text and background colours, or text on a natural background), or when no a priori colour information is available.

Alternatively, other conventional image processing methods like low-pass filtering can be used to smooth images. Such techniques do not depend on image content or colour information of an image. However, these techniques are not suitable for smoothing text and graphics, because they tend to blur high-contrast edges. The smoothing process should only be applied to jagged edges and preserve sharp discontinuities. Such conventional techniques disadvantageously smooth an image across all edges in the image.

Still further, conventional antialiasing techniques are often based on high-level information regarding image content such as geometrical shapes or character fonts. Consequently, such techniques are limited to applications where the features in a particular image are known and are disadvantageous in that image content is not always known and the image would have to be preprocessed to be reinterpreted at a higher level of abstraction.

A need clearly exists for an edge smoothing technique that overcomes one or more of the disadvantages of such conventional techniques. A general colour-independent, smoothing method is needed that can detect local edge information and avoid blurring sharp discontinuities. It is further desirable that such a technique preferably be capable of being applied to any kind of input data (ie. text, graphics or natural images), without prior segmentation to detect regions of interest or user intervention. A need exists for a technique that can smooth jagged lines, improve overall text appearance and readability, without blurring images or altering textures such as halftoned images.

SUMMARY

In accordance with a first aspect of the invention, there is provided a method of smoothing jagged edges in graphical data. The method comprises steps of detecting one or more edges of a selected pixel in the graphical data dependent upon intensities of the selected pixel and another pixel surrounding a respective site of the one or more edges and predetermined gradients of at least the selected pixel and the respective site surrounding pixel, and applying an adapted convolution mask to the selected pixel and a predetermined neighbourhood of pixels containing the selected pixel, wherein coefficient values of the convolution mask are dependent upon the one or more detected edges.

Preferably, the detecting step is dependent upon a difference between the intensities of the selected pixel and the site surrounding pixel satisfying an intensity threshold. It may also be dependent upon an absolute value of the difference exceeding the intensity threshold.

The detecting step may be dependent upon the predetermined gradients of the selected pixel and the site surrounding pixel satisfying a gradient threshold. The predetermined gradients are either vertical or horizontal dependent upon the edge site being either horizontal or vertical, respectively. The predetermined gradients are either greater than the gradient threshold, or are less than the gradient threshold.

Preferably, the detecting step is dependent upon predetermined gradients of diagonal pixels in the neighbourhood satisfying a gradient threshold. The predetermined gradients of the selected pixel and the site surrounding pixel may be greater than the gradient threshold, and the predetermined gradients of the diagonal pixels may be less than the gradient threshold. Alternatively, the predetermined gradients of the selected pixel and the site surrounding pixel may be less than the gradient threshold, and the predetermined gradients of the diagonal pixels may be greater than the gradient threshold.

Preferably, if a single edge is detected, one or more coefficient values of a portion of the convolution mask corresponding to an edge containing the site surrounding pixel is set to a predetermined value. The predetermined value may be zero.

Preferably, if a double edge is detected, one or more coefficient values of each portion of the convolution mask corresponding to a respective edge containing one of the two site surrounding pixels are set to a predetermined value. The predetermined value may be zero.

Optionally, the method may comprise the step of, for a detected double edge, determining whether the selected pixel is a thickening pixel dependent upon a horizontal gradient and a vertical gradient of a pixel at the junction of the two edges satisfy respective gradient thresholds. One or more coefficient values of a portion of the convolution mask corresponding to each edge opposite to the detected double edges may be set to a predetermined value.

Preferably, the detecting step is carried out for each colour component of the selected pixel, and the one or more detected edges are dependent upon the largest intensity and gradient values of the colour components.

In accordance with a second aspect of the invention, there is provided a method of smoothing jagged edges in graphical data. The method comprises the steps of: determining one or more edges if the intensities of a target pixel and a neighbouring pixel, both abutting a respective edge site, are substantially different, predetermined gradients dependent upon the respective edge site are an absolute local maxima, and predetermined gradients of diagonal pixels are not an absolute local maxima of the same sign as that of the neighbouring pixel; and modifying the target pixel using a filter having coefficient values dependent upon the one or more determined edges.

In accordance with a third aspect of the invention, there is disclosed a method of smoothing jagged edges in graphical data, the method comprising the steps of: determining one or more edges if the intensities of a target pixel and a neighbouring pixel, both abutting a respective edge site, are substantially different, and predetermined gradients dependent upon the respective edge site are an absolute local maxima; and modifying the target pixel using a filter having coefficient values dependent upon the one or more determined edges.

In accordance with a fourth aspect of the invention, there is provided a method of smoothing jagged edges in graphical data, the method comprising the steps of: (a) detecting a plurality of zones of the graphical data dependent upon the values of a plurality of pixels contained in each zone, the zones each containing a minority of either bright or dark pixels or containing an equal number of bright and dark pixels; and (b) for each zone, filtering pixels of the zone, the zone filtering comprising the steps of:

if the bright and dark pixels are substantially equally present, applying antialiasing to the zone; if the dark pixels are in a minority in the zone, applying thickening to the zone; and if the bright pixels are in a minority in the zone, applying thickening to the zone with relevant gradients negated.

In accordance with a fifth aspect of the invention, there is provided an apparatus for smoothing jagged edges in graphical data, the apparatus comprising: means for detecting one or more edges of a selected pixel in the graphical data dependent upon intensities of the selected pixel and another pixel surrounding a respective site of the one or more edges and predetermined gradients of at least the selected pixel and the respective site surrounding pixel; and filtering means for applying an adapted convolution mask to the selected pixel and a predetermined neighbourhood of pixels containing the selected pixel, wherein coefficient values of the convolution mask are dependent upon the one or more detected edges.

In accordance with a sixth aspect of the invention, there is provided an apparatus for smoothing jagged edges in graphical data, the apparatus comprising: means for determining one or more edges if the intensities of a target pixel and a neighbouring pixel, both abutting a respective edge site, are substantially different, predetermined gradients dependent upon the respective edge site are an absolute local maxima, and predetermined gradients of diagonal pixels are not an absolute local maxima of the same sign as that of the neighbouring pixel; and filtering means for modifying the target pixel, the filtering means having coefficient values dependent upon the one or more determined edges.

In accordance with a seventh aspect of the invention, there is provided an apparatus for smoothing jagged edges in graphical data, the apparatus comprising: means for determining one or more edges if the intensities of a target pixel and a neighbouring pixel, both abutting a respective edge site, are substantially different, and predetermined gradients dependent upon the respective edge site are an absolute local maxima; and filter means for modifying the target pixel, the filter means having coefficient values dependent upon the one or more determined edges.

In accordance with an eighth aspect of the invention, there is provided an apparatus for smoothing jagged edges in graphical data, the apparatus comprising: means for detecting a plurality of zones of the graphical data dependent upon the values of a plurality of pixels contained in each zone, the zones each containing a minority of either bright or dark pixels or containing an equal number of bright and dark pixels; and means for filtering pixels of each zone, the zone filtering means further comprising:

means for antialiasing the zone if the bright and dark pixels are substantially equally present; and means for thickening the zone if the dark pixels are in a minority in the zone or if the bright pixels are in a minority in the zone.

In accordance with a ninth aspect of the invention, there is provided a computer program product including a computer readable medium having recorded thereon a computer program for smoothing jagged edges in graphical data, the computer program product comprising: means for detecting one or more edges of a selected pixel in the graphical data dependent upon intensities of the selected pixel and another pixel surrounding a respective site of the one or more edges and predetermined gradients of at least the selected pixel and the respective site surrounding pixel; and filtering means for applying an adapted convolution mask to the selected pixel and a predetermined neighbourhood of pixels containing the selected pixel, wherein coefficient values of the convolution mask are dependent upon the one or more detected edges.

In accordance with a tenth aspect of the invention, there is provided a computer program product including a computer readable medium having recorded thereon a computer program for smoothing jagged edges in graphical data, the computer program product comprising: means for determining one or more edges if the intensities of a target pixel and a neighbouring pixel, both abutting a respective edge site, are substantially different, predetermined gradients dependent upon the respective edge site are an absolute local maxima, and predetermined gradients of diagonal pixels are not an absolute local maxima of the same sign as that of the neighbouring pixel; and filtering means for modifying the target pixel, the filtering means having coefficient values dependent upon the one or more determined edges.

In accordance with an eleventh aspect of the invention, there is provided a computer program product including a computer readable medium having recorded thereon a computer program for smoothing jagged edges in graphical data, the computer program product comprising: means for determining one or more edges if the intensities of a target pixel and a neighbouring pixel, both abutting a respective edge site, are substantially different, and predetermined gradients dependent upon the respective edge site are an absolute local maxima; and filter means for modifying the target pixel, the filter means having coefficient values dependent upon the one or more determined edges.

In accordance with a twelfth aspect of the invention, there is provided a computer program product including a computer readable medium having recorded thereon a computer program for smoothing jagged edges in graphical data, the computer program product comprising: means for detecting a plurality of zones of the graphical data dependent upon the values of a plurality of pixels contained in each zone, the zones each containing a minority of either bright or dark pixels or containing an equal number off bright and dark pixels; an means for filtering pixels of each zone, the zone filtering means further comprising:

means for antialiasing the zone if the bright and dark pixels are substantially equally present; means for thickening the zone if the dark pixels are in a minority in the zone or if the bright pixels are in a minority in the zone.

BRIEF DESCRIPTION OF THE DRAWINGS

Embodiments of the invention are described hereinafter with reference to the drawings, in which:

FIGS. 6A–6C are flow diagrams illustrating an edge detection process in accordance with a first embodiment of the invention;

FIGS. 15A to 15D illustrate the effect of smoothing on Japanese characters according to the second embodiment;

FIGS. 22A to 22C illustrate the process of comparing original and antialiased images in accordance with the third embodiment.

DETAILED DESCRIPTION

1. Overview

The present invention relates to an edge smoothing method and apparatus that preserves edges while smoothing jagged edges. This principally involves detecting edges in the input data, and modifying the smoothing filter dependent upon the edge detection results. The input data to this smoothing technique is a pixel-map representation of a pixel grid at a display resolution. Relevant data with jagged edges includes characters intended for use at a first resolution but which are used at a second, higher resolution. The embodiments of the invention have numerous applications, and are particularly useful in relation to image data having jagged edges such as text characters intended for display on a low-resolution display device, but which are displayed on a high-resolution display device (e.g., an FLCD panel having a display resolution that is twice the input resolution). The smoothing method assumes that the data have previously been increased to a higher resolution, or upsampled, without attempting to smooth sharp edges (e.g., by replicating the input pixels into four identical subpixels). Using the edge detection and smoothing processes of the embodiments of the invention, the overall appearance and readability of the text is improved even if individual letters are not always improved.

In the following description, numerous specific details including particular resolutions, colour space formats, specific pixel-size processing windows, specific pixel-size convolution masks, etc. are described in detail to provide a more thorough description of the embodiments of the invention. However, it will be apparent to one skilled in the art that the present invention may be practiced without these specific details. In other instances, well-known features have not been described in detail so as not to unnecessarily obscure the present invention.

Figure 1:
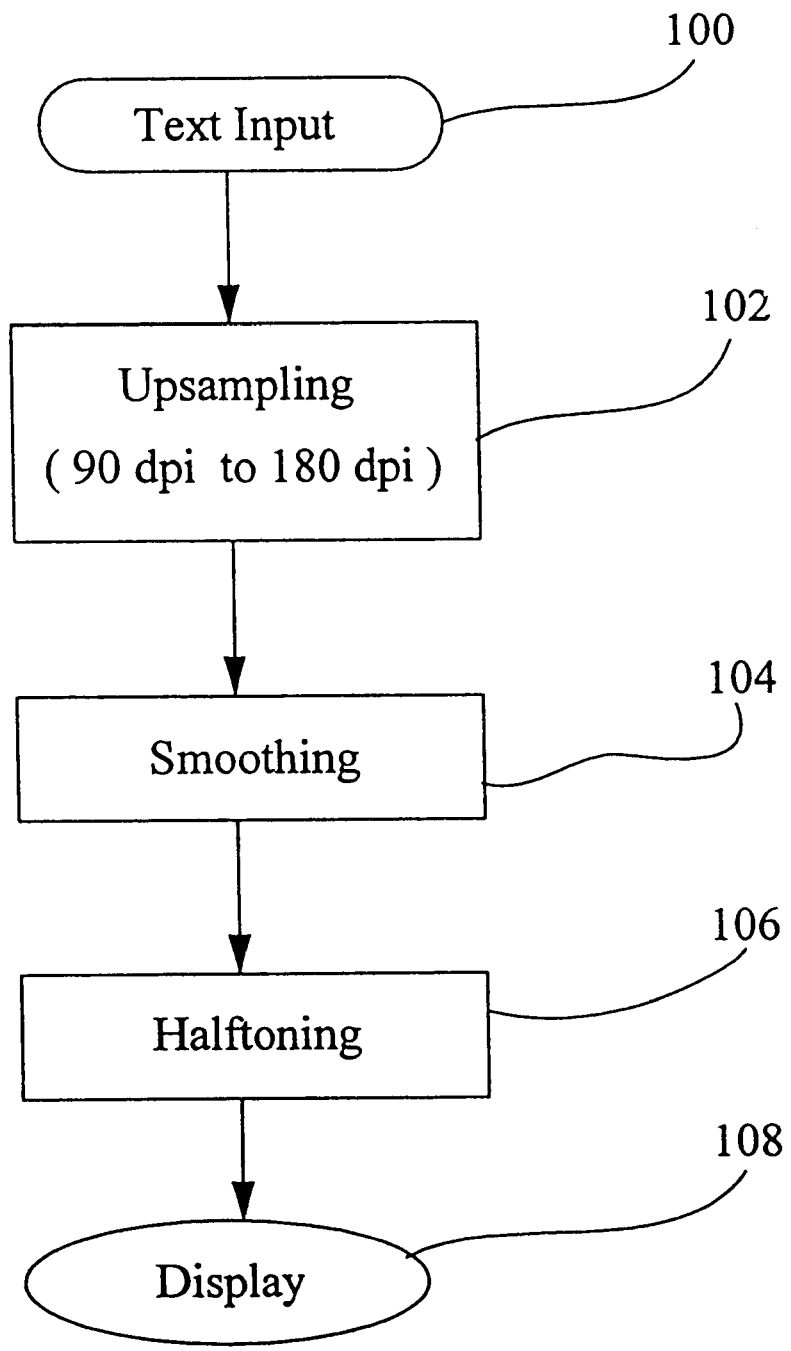
FIG. 1 is a flow diagram illustrating data flow for an FLCD panel.

FIG. 1 illustrates an exemplary FLCD data flow. The representation of images on an FLCD typically involves a number of stages. For example, using an input image 100, upsampling is performed in step 102 which resolves the data from a lower resolution (eg. 90 dpi) to a higher resolution (eg. 180 dpi). The image data may then be smoothed in step 104, thereby reducing or eliminating any jagged edges. This step 104 is followed by steps 106 and 108 of halftoning and displaying the halftoned pixels, respectively.

The pixel-map comprises a numerical representation of a particular colour for each pixel location in a rectangular array. Any numerical representation of colour may be used as long as it is expressed as a sequence of one or more numbers. Preferably, the data information is supplied on a pixel-by-pixel basis in raster image order (ie. from left to right across a display device and from top to bottom of the display device in a non-interlaced fashion). Pixel locations at the pixel grid are represented by an array of row (i) and column (j) specifications. All the pixels are treated sequentially, and the output for a target pixel depends on the input data in a limited neighbourhood of this pixel.

Figure 2:
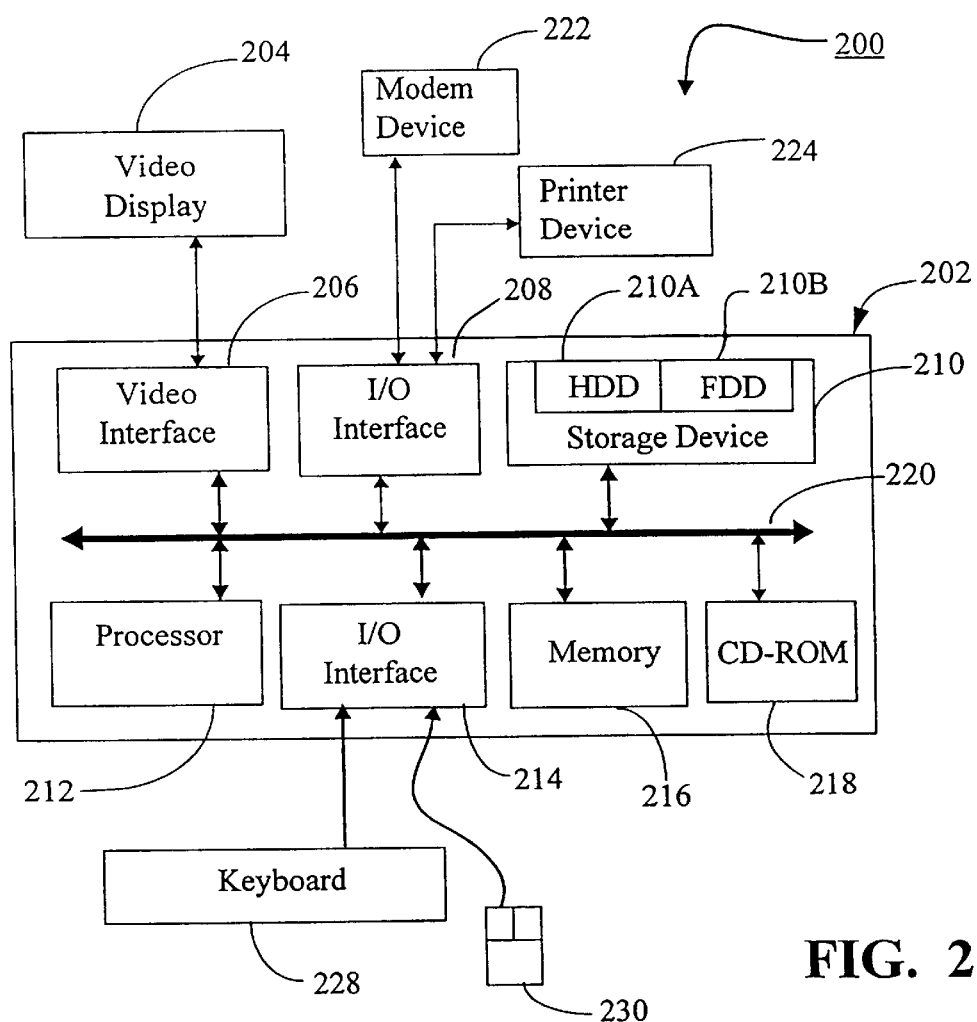
FIG. 2 is a block diagram of a general purpose computer with which the embodiments of the invention can be practiced.

The embodiments of the invention are preferably implemented using a conventional general-purpose (host) computer system, such as the computer system 200 shown in FIG. 2. Further, the processes of detecting and smoothing edges according to the embodiments of the invention can be embodied in an application program and are preferably implemented as software loaded into and carried out using the computer system 200. The software can be loaded into the computer system 200 from a computer readable medium including the storage devices described below, for example. The computer system 200 includes a computer module 200, one or more input devices such as a keyboard 228 and mouse 230, and one or more output devices such as a printer or other reproduction device 224 including plotters, laser printers, etc., and a computer display monitor 204.

A video interface/adaptor 206 connected to the video display monitor 204 provides video signals from the computer module 202 for display on the video display monitor 204. A modulator-demodulator (Modem) transceiver device 222 may be used by the computer module 202 for communicating to and from a computer network, for example connectable via a telephone line or other functional medium. The modem 222 can be used to obtain access to the Internet and other network systems. Optionally, the computer system may also include a network adaptor (not shown) for connecting the computer to a computer network such as a local area network (LAN) or wide area network (WAN), for example. Other connection interfaces such as ISDN may be used also.

The computer module 202 typically includes at least one central processing unit (CPU) 212, a memory unit 216, for example formed from semiconductor random access memory (RAM) and read only memory (ROM), input/output (I/O) interfaces 206 and 208 including a video interface 206, and an I/O interface 214 for the keyboard 228, a mouse 230 and optionally a joystick (not shown). A storage device 210 is provided and typically includes a hard disk drive 210A and a floppy disk drive 210B. The storage device 210 may also comprise a magneto-optical disc drive, magnetic tape, DVD, etc. A CD-ROM drive 218 is typically provided as a non-volatile source of data.

The components 206 to 210 and 212 to 218 of the computer module 202 typically communicate via an interconnected bus 220 and in a manner which results in a conventional mode of operation of the computer system 200 known to those in the relevant art. Such a bus 220 typically comprises data, address, and control buses. However, the overall structure and individual components of the computer system 600 are conventional and are well known to persons skilled in the art.

Thus, the system 200 is simply provided for illustrative purposes and other configurations can be employed without departing from the scope and spirit of the invention. The computer system may be implemented using an IBM personal computer (PC) or compatible, one of the Macintosh (TM) family of PCs, Sun Sparcstation (TM), or the like. The foregoing are merely exemplary of the types of computers with which the embodiments of the invention may be practiced. Typically, the application program of the preferred embodiment is resident as software recorded on a hard disk drive 210A as the computer readable medium, and read and controlled using the processor 212. Intermediate storage of the program and pixel data and any data fetched from the network may be accomplished using the semiconductor memory 216, possibly in concert with the hard disk drive 210A. In some instances, the application program may be supplied to the user encoded on a CD-ROM 218 or a floppy disk 210B, or alternatively could be read by the user from the network via the modem device 222, for example. Still further, the software can also be loaded into the computer system 200 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

Embodiments of the invention are described in detail hereinafter. Again, such embodiments may preferably be implemented using the representative computer system 200.

2. Antialiasing Process of First Embodiment

The edge-preserving smoothing process according to a first embodiment comprises two component processes: edge detection and smoothing. The edge detection process determines the presence and direction of edges of target pixels of input image data. Once the results of the edge detection process are determined, the edge smoothing process applies a linear smoothing filtering process to the target pixels. The filtering process itself is modified dependent on any detected edges to preserve such detected edges in the image data. The edge detection and smoothing processes are described in greater detail hereinafter.

2.1. Edge Detection Process

As noted above, the edge detection process aims at determining the presence and direction of edges. The process first involves computing and thresholding relevant horizontal and vertical gradients of pixels. Then, edge information is collected for each target pixel by turning "ON" or "OFF" four surrounding edge sites of a target pixel being processed.

2.1.1. Gradient Computation and Thresholding

Gradient computation and thresholding is used to detect discontinuities in image data. The process of discontinuity detection relies on a first-order derivative method requiring the generation of gradients in two orthogonal (horizontal and vertical) directions. This can be done using any orthogonal differential gradient operator. For example, two 3×3 pixel convolution masks corresponding to the Sobel edge detector may be used. The Sobel gradient operator consists of the horizontal and vertical convolution kernels shown in Table 1.

TABLE 1

| 1/4 | −1 | 0 | 1 |
|---|---|---|---|
|  | −2 | 0 | 2 |
|  | −1 | 0 | 1 |

Horizontal gradient operator

| 1/4 | −1 | −2 | −1 |
|---|---|---|---|
|  | 0 | 0 | 0 |
|  | 1 | 2 | 1 |

Vertical gradient operator

Discontinuities are characterised by high gradient values and high intensity differences between neighbouring pixels. Thus, the edge detection process of the first embodiment defines two thresholds: one for the gradient, and another for the intensity.

The first threshold is determined to detect a local maximum of either a vertical or horizontal gradient, so that edges can be detected regardless of the contrast. A value Tg can be such a gradient threshold. The threshold Tg preferably corresponds to a predetermined percentage of the absolute maximum value of vertical and horizontal components of the gradient of all colour components in the neighbourhood of the target pixel. For example, Tg can be set to one third of the absolute maximum gradient value on a 3×3 pixel window centred on the pixel being currently processed (ie, the target pixel).

The second threshold Tf is used to detect significant intensity differences between pixels. It may also be defined as a predetermined percentage of the total intensity range, typically a small percentage (e.g., one percent) if the images are noise-free. The threshold Tf may be defined independently of the pixel location. For instance, a unique intensity threshold may be used for the whole image. The relevant gradient threshold, intensity difference threshold, and computed gradient values are used in the edge site determination process described hereinafter.

2.1.2. Edge Site Determination Process

Figure 3:
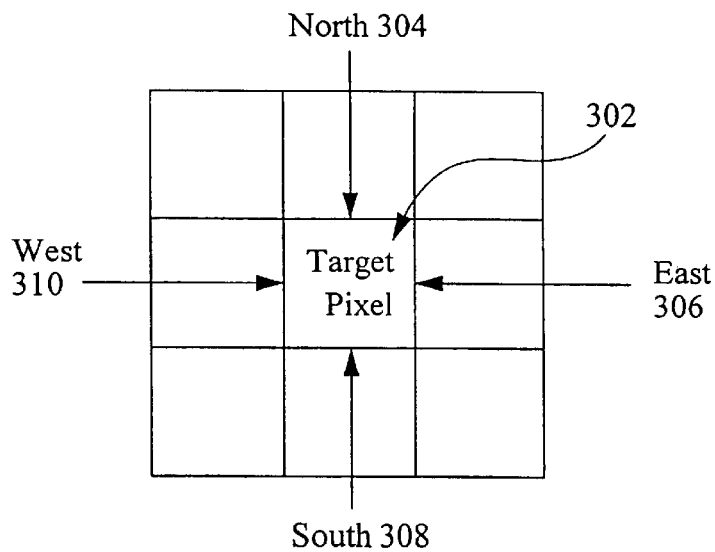
FIG. 3 illustrates a processing window containing a centre pixel surrounded by four edge sites.

For each pixel, the edge detection process of the first embodiment depends on the gradient and intensity values in a 3×3 pixel neighbourhood as shown in FIG. 3. Each target pixel 302 in the centre of the neighbourhood is treated as being surrounded by four potential edge sites, labelled East 306, North 304, West 310 and South 308 according to the corresponding compass directions. The East and West edge sites 306, 310 correspond to vertical edges. In contrast, the North and South edge sites 304, 308 correspond to horizontal edges. The presence or absence of an edge determines whether those sites are "ON" or "OFF".

A principal difficulty for the smoothing process is to distinguish between oblique lines or curves, which suffer from a staircase effect and need to be smoothed, and horizontal or vertical edges that are to be preserved without smoothing. According to the first embodiment of the invention, the edge sites are turned on only if they belong to a true horizontal or vertical line (which is more than 2 pixel long) and not to a diagonal line.

A vertical edge site is turned on if the following conditions are met:

A) the intensities of the two pixels surrounding the edge site (i.e., the target pixel and either the relevant left or right pixel) are significantly different;

B) the horizontal gradient values of those two surrounding pixels are an absolute local maxima; and C) the horizontal gradient values of the relevant diagonal pixels are not an absolute local maxima of the same sign as the surrounding pixels (i.e., the target pixel is not likely to belong to a diagonal line).

Figure 4:
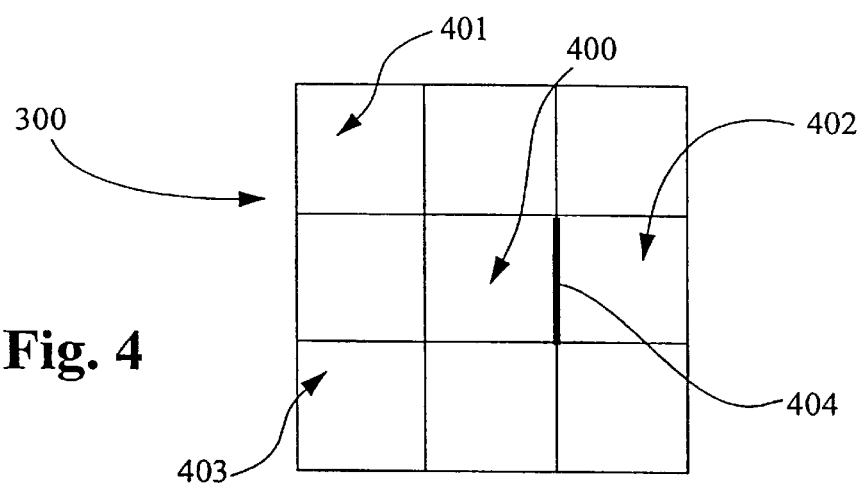
FIG. 4 illustrates a processing window, like that of FIG. 3, including the surrounding pixels that are considered for the edge detection at the eastern edge site.

For example, FIG. 4 is a block diagram of a group of pixels 300 indicating the relevant pixels used to determine whether an East edge site 404 is "ON" or "OFF". The group of pixels is centred on a target pixel 400. The target pixel 400 and the right pixel 402 surround the edge site 404. In the foregoing process for determining if a relevant vertical (ie, East) edge site is on, the difference in intensities of the two pixels 400, 402 and the horizontal gradients of the two pixels 400, 402 are checked. Further, upper left pixel 401 and lower left pixel 403 are the relevant diagonal pixels (relative to the target pixel 400) considered for the East edge site 404. The horizontal gradient values of these pixels are also checked. Pixels of the group 300 are analogously used to determine the state of the other horizontal edge site (i.e., West).

Similarly, a horizontal edge site is turned on if the following conditions are met:

A) the intensities of the two pixels surrounding the edge site (i.e., the target pixel and either the relevant top or bottom pixel) are significantly different;

B) the vertical gradient values of those two surrounding pixels are an absolute local maxima; and C the vertical gradient values of the relevant diagonal pixels are not an absolute local maxima of the same sign as the surrounding pixels.

Again, analogous pixels of the group 300 shown in FIG. 4 are used to determine the state of the horizontal edge site (i.e., North or South).

A more precise statement of the rules for determining if edge sites are on is given in Table 2.

TABLE 2

Rule 1: The EAST edge is "ON" if:
(i)   abs((F(i, j) − F(i, j + 1)) > Tf; AND
(ii)  EITHER:
      (Gx(i, j) > Tg and Gx(i, j + 1) > Tg and Gx(i − 1, j − 1) < Tg and Gx(i + 1, j − 1) < Tg),
      OR
      (Gx(i, j) < −Tg and Gx(i, j + 1) < −Tg and Gx(i − 1, j − 1) > −Tg and Gx(i + 1, j − 1) > −Tg).
Rule 2: The WEST edge is "ON" if:
(i)   abs((F(i, j) − F(i, j − 1)) > Tf; AND
(ii)  EITHER:
      (Gx(i, j) > Tg and Gx(i, j − 1) > Tg and Gx(i − 1, j + 1) < Tg and Gx(i + 1, j + 1) < Tg),
      OR
      (Gx(i, j) < −Tg and Gx(i, j − 1) < −Tg and Gx(i − 1, j + 1) > −Tg and Gx(i + 1, j + 1) > −Tg).
Rule 3: The NORTH edge is "ON" if:
(i)   abs((F(i, j) − F(i − 1, j)) > Tf; AND
(ii)  EITHER:
      (Gy(i, j) > Tg and Gy(i − 1, j) > Tg and Gy(i + 1, j − 1) < Tg and Gy(i + 1, j + 1) < Tg),
      OR
      (Gy(i, j) < −Tg and Gy(i − 1, j) < −Tg and Gy(i + 1, j − 1) > −Tg and Gy(i + 1, j + 1) > −Tg).
Rule 4: The SOUTH edge is "ON" if:
(i)   abs((F(i, j) − F(i, j + 1)) > Tf; AND
(ii)  EITHER:
      (Gy(i, j) > Tg and Gy(i, j + 1) > Tg and Gy(i − 1, j − 1) < Tg and Gy(i − 1, j + 1) < Tg),
      OR
      (Gy(i, j) < −Tg and Gy(i, j + 1) < −Tg and Gy(i − 1, j − 1) > −Tg and Gy(i + 1, j + 1) > −Tg).

In Table 2, the parameters i and j are the row and column numbers, respectively, of the pixel being currently processed (i.e., the target pixel). The terms F(i,j), Gx(i,j) and Gy(i,j) represent the intensity, horizontal gradient and vertical gradient, respectively, at the target pixel (i,j). The term abs(x) refers to the absolute value of x. The edge detection rules for the four edge sites shown in Table 2 amount to turning the edge site on if two relevant conditions regarding (i) intensity and (ii) gradients are satisfied.

For colour images, the edge detection process is performed by testing all colour components of the target pixel using the rules set forth in Table 2. This may be done sequentially. Preferably, the edge information is inferred from the colour component that has the largest contrast or the largest absolute gradient value. When detecting the colour component that has the largest contrast, a different weight can be given to each colour component. For example, in the case of RGB images, weights can be chosen that are proportional to the weights used for the computation of luminance (i.e., 0.299 for the red colour component, 0.587 for the green colour component, and 0.114 for the blue colour component of the target pixel).

2.1.3. Flow Diagrams of the Generalised Edge Detection Process

Figure 6A:
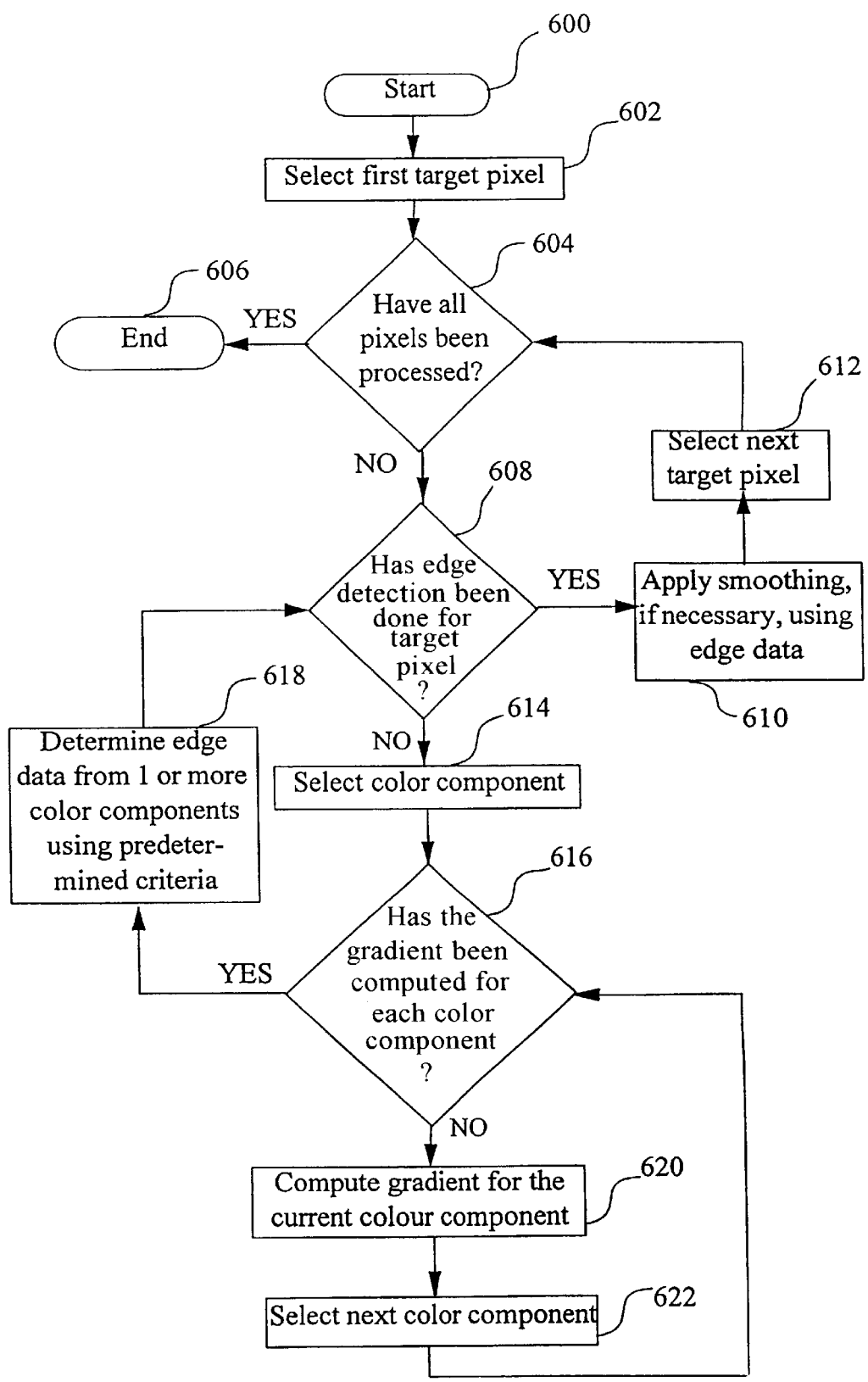
Figure 6B:
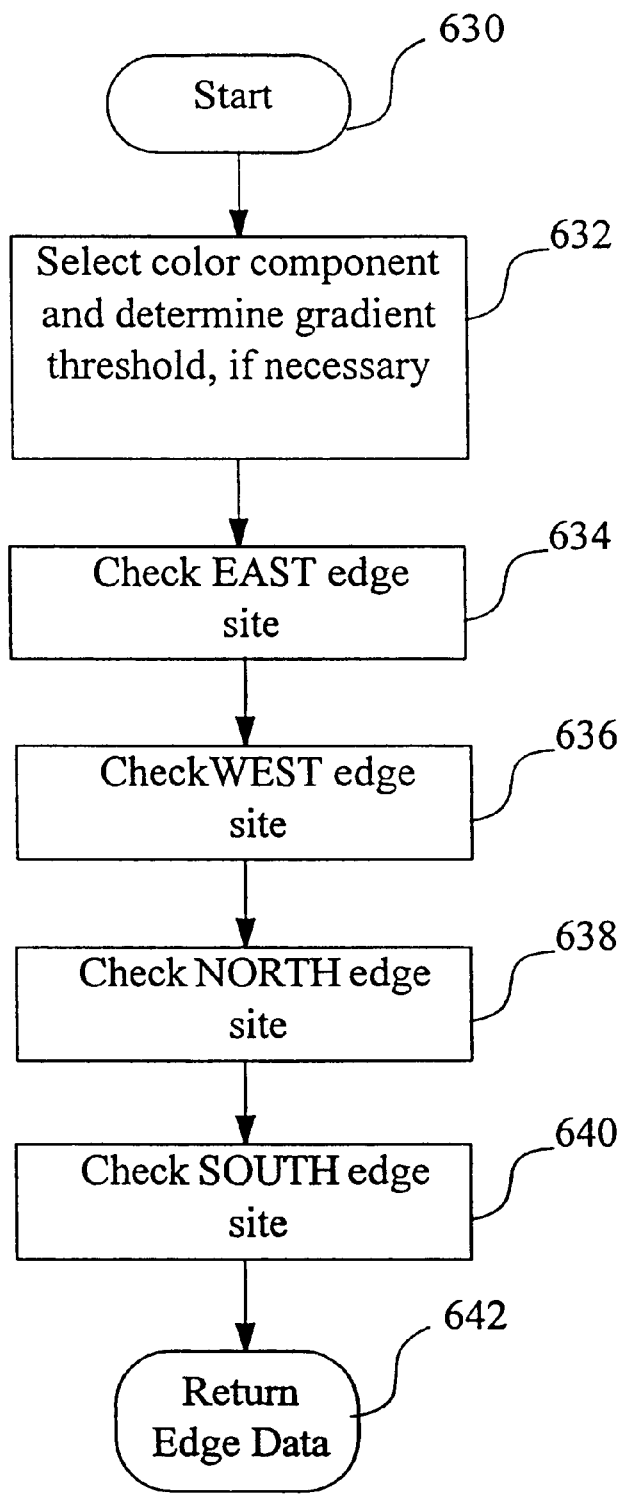

FIGS. 6A to 6C provide a generalised flow diagram providing an overview of the process of detecting edges contained in image data in accordance with the first embodiment.

In particular, FIG. 6A provides one possible implementation at a high level for detecting edges in digital image data comprising a plurality of pixels, as well as the smoothing or filtering step described hereinafter in another section. FIG. 6B is an intermediate level flow diagram of the process of edge detection for a given target pixel. Finally, FIG. 6C is a flow diagram illustrating the process of edge site determination for a given target pixel, where the steps are illustrated as generalised representations of the edge site determination rules stated in Table 2.

With regard to FIG. 6A, processing commences in step 600. In step 602, one of the pixels of the image data to be processed is selected as the first target pixel. In decision block 604, a check is made to determine if all pixels of the image data including the selected target pixel have been processed. If decision block 604 returns true (yes) indicating that all pixels have been processed, processing terminates at step 606.

If decision block 604 returns false (no) indicating that the selected target pixel has not yet been processed, processing continues at decision block 608. In decision block 608, a check is made to determine if edge detection has been done for the target pixel. If decision block 608 returns true (yes), processing continues at step 610. In step 610, smoothing or filtering is applied to the image data, if necessary, dependent upon the results of the edge detection process. This step is described in greater detail hereinafter with reference to FIG. 7. In step 612, the next target pixel is selected, and processing then continues at the decision block 604.

Otherwise if decision block 608 returns false (no), processing continues at step 614. In step 614, one of the colour components of the target pixel is selected for processing. While the first embodiment is described in relation to a multi-component colour value for each pixel, the present invention is equally applicable to grey scale images with minor changes to step 614 and decision block 616. In decision block 616, a check is made to determine if the gradient has been computed for each color component. If decision block 616 returns false (no), processing continues at step 620. In step 620, the gradient computation process is carried out using the currently selected colour component of the selected target pixel. In step 622, the next remaining color component, if any, is selected and processing continues at decision block 616.

If decision block 616 returns true (yes), processing continues at step 618. In step 618, edge data from 1 or more color components is determined using predetermined criteria. Processing then continues at decision block 608.

FIG. 6B is a flow diagram illustrating further details of the steps carried out to implement the edge detecting step 618 of FIG. 6A. In step 630, processing commences. In step 632, the colour component with the biggest contrast is selected, and the gradient thresholds are also determined, if necessary. Processing continues at step 634. In step 634, the East edge site is checked. In step 636, the West edge site is checked. In step 638, the North edge site is checked. In step 640, the South edge site is checked. The edge data determined from step 632 to 640 for the selected colour component of the target pixel is returned in step 642 to colouring processing. While particular ordering of steps is shown in FIG. 6B, changes can be made to the ordering and nature of the steps without departing from the scope and spirit of the invention.

FIG. 6C is a flow diagram of the generalised steps carried out to implement each of steps 634 to 640 in FIG. 6B so as to implement the edge site determination rule of Table 2. Processing commences in step 660. In step 662, a check is made to determine if a difference between the intensity values of the target pixel and the relevant other surrounding pixel (i.e., right, top, left or bottom pixel for the East, North, West or South edge site, respectively) is greater than the predetermined intensity threshold. Decision block 662 implements sub-rule (i) of each of the rules of Table 2. When decision block 660 returns false (no) indicating that the absolute value of the intensity different is not greater than the threshold intensity, processing continues at step 668. In step 668, the respective edge of the target pixel for the selective colour component is set to "OFF". Processing then continues at step 670 and the edge data is returned to the calling procedure.

If decision block 662 returns true (yes), processing continues at decision block 664. In decision block 664, a check made to determine if the relevant gradients (i.e., the horizontal or vertical gradient) of the target pixel and the respective other surrounding pixel (i.e., right, top, left or bottom pixel) is either greater than the gradient threshold or less than the negative value of the gradient threshold. This check implements the first portion of the two alternative substeps of sub-rule (ii) if Table 2. If decision block returns false (no), processing continues at step 668 as described hereinbefore. Otherwise, if decision block 664 returns true (yes), processing continues at decision block 666. In decision block 666, a check is made to determine if the relevant gradients (i.e., the horizontal or vertical gradient) of the two diagonal pixels are less than the threshold gradient or greater than the negative value of the threshold gradient, respectively. Decision block 666 implements the second substep of sub-rule (ii) of the rules in Table 2. If decision block 672 returns false (no), processing continues at step 668. Otherwise, if decision block 666 returns true (yes), processing continues at step 672. In step 672, the respective edge (i.e., East, North, West or South) of the target pixel is set as "ON". Processing then continues at step 670. While the flow diagrams of FIGS. 6A to 6C illustrate specific steps and ordering of steps, it will be apparent to one skilled in the art that modifications and/or changes to the particular steps and/or ordering of steps can be made to the edge detection process of the first embodiment without departing from the scope and spirit of the invention.

In the foregoing manner, horizontal or vertical lines or curves can be determined. As is described hereinafter, the presence of "ON" edge sites is used to modify smoothing or filtering processes so as to preserve specified edges.

2.2. Smoothing Process

The edge smoothing process of the first embodiment involves applying a linear smoothing filter to each colour component resulting in all the colour components being smoothed identically. To preserve the detected edges, the convolution kernel of the filter is modified dependent upon the outcome of the edge detection for a target pixel. In particular, the filter values corresponding to the pixels surrounding the detected edge are set to zero.

Figure 5:
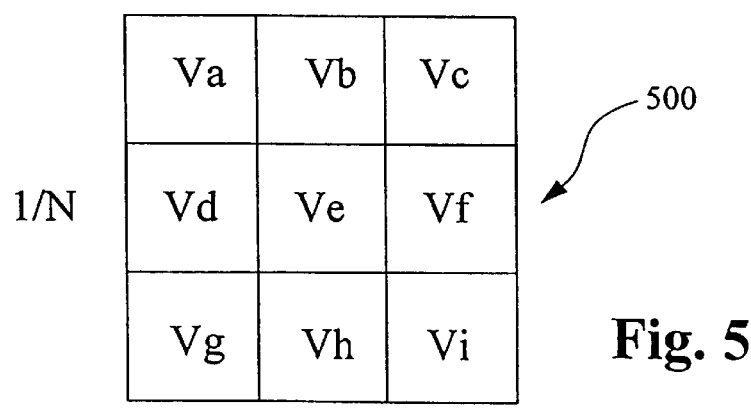
FIG. 5 illustrates the naming convention of a smoothing filter.

In the smoothing process, any linear smoothing filter may be used. The modifications to be made to the filter are described with reference to a convolution kernel 500 that is preferably 3×3 pixels in size, as shown in FIG. 5. The three kernel values in the first row, from the first column to the third column, are referred to as Va, Vb and Vc, respectively. The three kernel values in the second row, from the first column to the third column, are Vd, Ve and Vf, respectively. The three values in the third row, from the first to the third column, are Vg, Vh and Vi, respectively. These values are normalised by a normalisation factor of 1/N, where N is the sum of all coefficients. For example, a 4-neighbour mean filter may be used. The classical formulation for this particular convolution kernel is given in Table 3.

TABLE 3

|  | 0 | 1 | 0 |
|---|---|---|---|
| 1/4 | 1 | 0 | 1 |
|  | 0 | 1 | 0 |

Example of smoothing filter

In the convolution kernel of Table 3, the kernel values Vb Vd=Vf=Vh=1, the kernel values Va=Vc=Ve=Vg=Vi=0, and N=4.

In the following description, the smoothing process of the first embodiment is described in relation to three possible forms of this processing, that is full smoothing, no smoothing, and modified smoothing.

2.2.2. Full Smoothing

If the four edge sites of a target pixel are "OFF" and either the horizontal or the vertical gradient is an absolute local minima, the target pixel is likely to belong to an oblique line. Therefore, unmodified or full smoothing filter is applied to the target pixel.

2.2.3. No Smoothing

If the four edge sites are "OFF" and neither the horizontal nor the vertical gradient is an absolute local minima, there is no edge around the target pixel. Therefore, smoothing is not performed on the target pixel. The output value for the target pixel is equal to its input value. Thus, only pixels in the region of an edge are affected by the smoothing procedure. Other pixels are left unchanged to avoid unnecessary blurring of other parts of the image.

2.2.3. Modified Smoothing

If a single or multiple edge of a target pixel has been detected (i.e., one or more edge sites is "ON"), a smoothing filter is applied, where an expression for the smoothing filter depends on the site that is turned on. In the modified smoothing filter, all the filter values remain identical to the classical filter, except for the ones that are next to the detected edge. Those values are turned to zero to preserve the discontinuity at the edge, and the normalisation factor of the filter is adjusted accordingly.

2.2.4. Smoothing Rules

Smoothing or filtering of target pixels in accordance with the first embodiment involves applying full, no and modified smoothing to a target pixel (i,j) dependent upon the edge detection results. More precise statements of these smoothing rules for modifying the convolution kernel are set forth in Table 4.

TABLE 4

Rule 1: If the four edge sites are "OFF":
if(abs(Gx(i, j)) > Tg and abs(Gy(i, j)) > Tg)
    Vb = Vd = Vf = Vh = 1, Va = Vc = Ve = Vg = Vi = 0, and N = 4
else
    Vb = Vd = Vf = Vh = Va = Vc = Ve = Vg = Vi = 0.
Rule 2: If one of the four edge sites is "ON", the filter values are the same as in
    Rule 1 except for:
| | |
|---|---|
| EAST: | Vc = Vf = Vi = 0 and N = Va + Vb + Vd + Ve + Vg + Vh |
| NORTH: | Va = Vb = Vc = 0 and N = Vd + Ve + Vf + Vg + Vh + Vi |
| WEST: | Va = Vd = Vg = 0 and N = Vb + Vc + Ve + Vf + Vh + Vi |
| SOUTH: | Vg = Vh = Vi = 0 and N = Va + Vb + Vc + Vd + Ve + Vf |

Rule 3: If two edge sites are "ON", all the filter values are the same as in Rule
    1 except for:
| | |
|---|---|
| NORTH-EAST: | Va = Vb = Vc = Vf = Vi = 0 and N = Vd + Ve + Vg + Vh |
| NORTH-WEST: | Va = Vb = Vc = Vd = Vg = 0 and N = Ve + Vf + Vh + Vi |
| SOUTH-EAST: | Vc = Vf = Vg = Vh = Vi = 0 and N = Va + Vb + Vd + Ve |
| SOUTH-WEST: | Va = Vd = Vg = Vh = Vi = 0 and N = Vb + Vc + Ve + Vf |
| NORTH-SOUTH: | Va = Vb = Vc = Vg = Vh = Vi = 0 and N = Vd + Ve + Vf |
| EAST-WEST: | Va = Vc = Vd = Vf = Vg = Vi = 0 and N = Vb + Ve + Vh |

The rules can be generalised for the cases where more than 2 (i.e., 3 or 4) edge sites are on.

Thus, either full smoothing or no smoothing is applied in Rule 1 of Table 4. With the chosen filter, Rule 2 amounts to performing a 3-neighbour interpolation. Rule 3 amounts to performing a 2-neighbour interpolation. Table 5 illustrates the convolution masks for the specific smoothing filter of Table 3 implemented in accordance with the smoothing rules of Table 4.

TABLE 5

Single edges:

| | | | | |
|---|---|---|---|---|
| 1/3 | 0 1 0 | | 1/3 | 0 0 0 |
| | 1 0 0 | | | 1 0 1 |
| | 0 1 0 | | | 0 1 0 |
| | EAST | | | NORTH |
| 1/3 | 0 1 0 | | 1/3 | 0 1 0 |
| | 0 0 1 | | | 1 0 1 |
| | 0 1 0 | | | 0 0 0 |
| | WEST | | | SOUTH |

Double edges:

| | | | | |
|---|---|---|---|---|
| 1/2 | 0 0 0 | | 1/2 | 0 0 0 |
| | 1 0 0 | | | 0 0 1 |
| | 0 1 0 | | | 0 1 0 |
| | NORTH-EAST | | | NORTH-WEST |
| 1/2 | 0 1 0 | | 1/2 | 0 1 0 |
| | 1 0 0 | | | 0 0 1 |
| | 0 0 0 | | | 0 0 0 |
| | SOUTH-EAST | | | SOUTH-WEST |
| 1/2 | 0 0 0 | | 1/2 | 0 1 0 |
| | 1 0 1 | | | 0 0 0 |
| | 0 0 0 | | | 0 1 0 |
| | NORTH-SOUTH | | | EAST-WEST |

The convolution masks for the exemplary filter are applied to the target pixel and its neighbourhood of pixels dependent upon the number and particular combination of edge sites detected as "ON".

2.2.5. Flow Diagram of Smoothing Process

Figure 7:
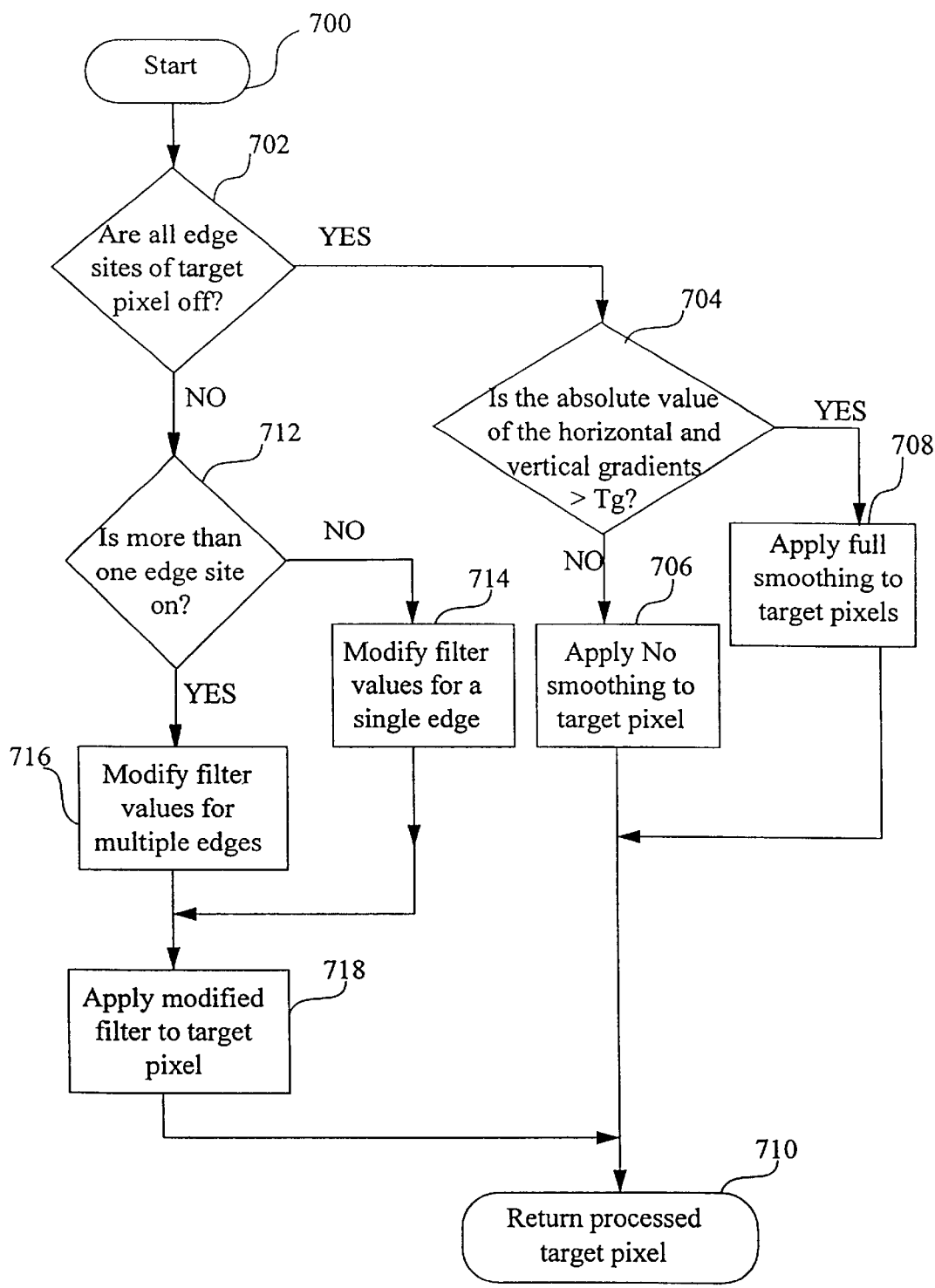
FIG. 7 is a flow diagram illustrating a smoothing or filtering process in accordance with the first embodiment of the invention

FIG. 7 is a flow diagram providing an overview of the process of smoothing edges contained in image data in accordance with the first embodiment. The process of FIG. 7 is preferably used to implement step 620 of FIG. 6A for applying smoothing to a target pixel dependent upon edge data.

The process of FIG. 7 is illustrated for the processing of a single target pixel. However, this process can be readily repeated using stored edge data as a post edge detecting process. Alternatively, the process of FIG. 6A could be modified by placing step 620 between steps 616 and 618 so that the process can be implemented on a per target pixel basis as the edge detection process is carried out for each target pixel of image data.

Processing commences in step 700. In step 702, the currently processed target pixel is checked to determine if all edge sites of the target pixel are off. If decision block 702 returns true (yes), processing continues at decision block 704. In decision block 704, a check is made to determine if the absolute value of the horizontal and vertical gradients of the target pixels are greater than the threshold gradient. If decision block 704 returns true (yes), processing continues at step 708. In step 708, full smoothing is applied to the target pixel in accordance with rule 1 of Table 2. Otherwise, if decision block 704 returns false (no), processing continues at step 706. In step 706, no smoothing is applied to the target pixel in accordance with rule 1. After step 706 or 708, processing continues at step 710. In step 710, the target pixel processed in accordance with the smoothing method of the first embodiment is returned.

If decision block 702 returns false (no), processing continues at decision block 712. In decision block 712, a check is made to determine if there is more than one edge site of the target pixel that is turned on. If decision block 712 returns false (no), processing continues at step 714. In step 714, the filter values of the convolution mask are modified for the case of a single edge. In particular, the filter values are modified in accordance with rule 2 of Table 4 dependent upon whether the single edge site is the East, North, West or South edge site. Processing then continues at step 718. Otherwise, if decision block 712 returns true (yes), processing continues at step 716. In step 716, the filter values for the convolution mask are modified for multiple detected edges. The filter coefficients are modified in accordance with rule 3 of Table 4, which lists the six possible combinations for a double edge. In this connection, each of six possible modifications is to be read so that the two noted edges for each of the six possibilities is read conjunctively (e.g., north-east is the north and east edge site).

In step 718, the modified filter is applied to the target pixel and the surrounding neighbourhood pixels to generate the filtered target pixel. Table 5 illustrates modified filter values for the exemplary filter of Table 3 produced by respective steps 714 and step 716 of FIG. 7 dependent upon the "ON" edge site(s). In step 710, the process target pixel is returned.

2.3. Example of Edge Detection and Smoothing Processes

Figure 8A:
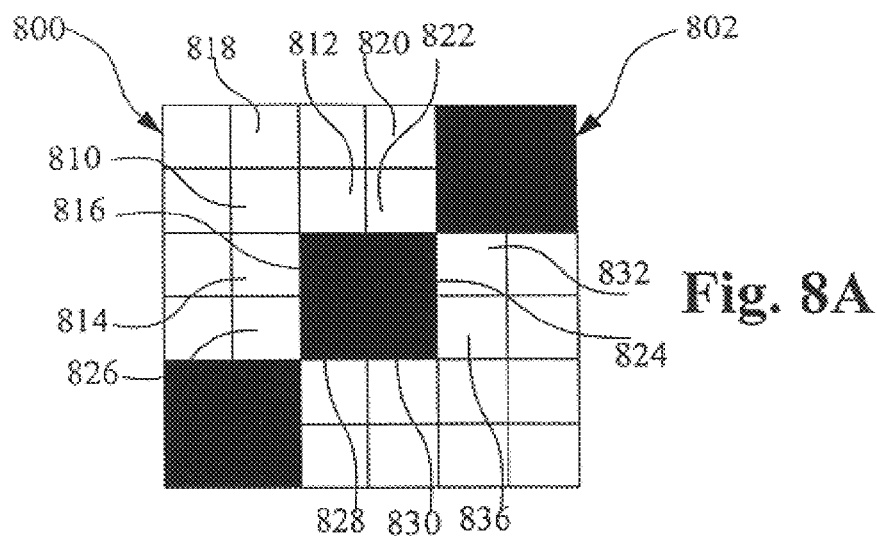
FIGS. 8A to 8C illustrate block diagrams of exemplary input data containing a diagonal line, edge detection results, and filtered output data produced in accordance with the first embodiment shown in FIGS. 6A–6C and 7A.

FIG. 8A is a block diagram of an array 800 of input pixels containing a jagged or unsmoothed diagonal line 802 having a slope of 45 degrees. In this example, the pixels of the input image have either black (0) or white (1) intensity levels. However, intermediate grey-scale values are possible. The processing of all of the pixels is described by way of example with reference to a number of pixels 810–816 and 824 in terms of the edge detection process of FIGS. 6A–6C and the smoothing process of FIG. 7. The edge detection results 840 and the smoothed image data 870 are shown in FIGS. 8B and 8C, respectively.

To detect edges in the image data array 800, the process of FIG. 6A is applied to the input array 800. In this case, because the input image is greyscale, only a single "colour" component is processed for each target pixel and its neighbours.

Figure 8B:
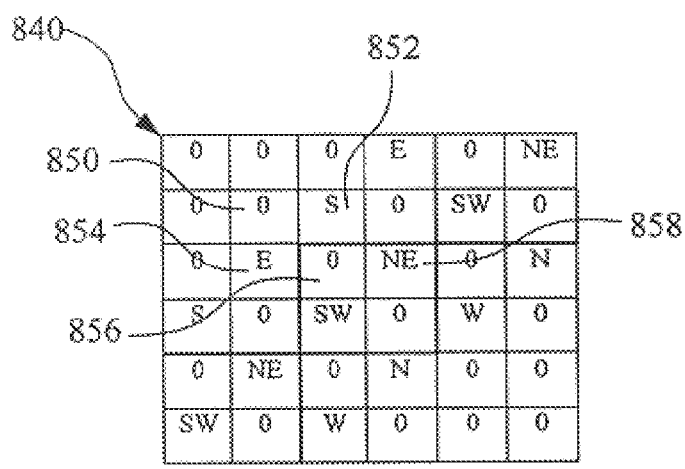
Figure 8C:
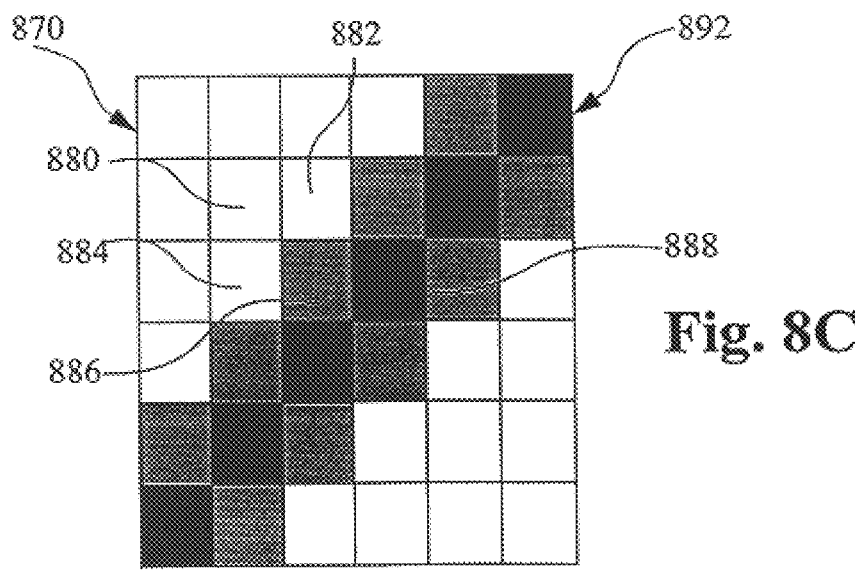

FIG. 8B illustrates the results 840 of the edge detection process of FIGS. 6A–6C applied to the input data array 800. For example, the edge detection result 850 corresponding to input pixel 810 of FIG. 8A indicates there are zero edges that are "ON". As shown in FIG. 8A, the target pixel 810 does not have any possible "ON" edges since the target pixel 810 and each of its neighbouring pixels surrounding a respective edge site are white. The pixels have the same intensity as the target pixel, and therefore the edge sites are all "OFF". In contrast, the next pixel 812 when processed as the target pixel has a South edge that is "ON". This is due to the intensity difference between the target pixel 812 (white) and the bottom pixel 816 (black) exceeding the predetermined intensity threshold (Tf). Also, the vertical gradients ($Gy=-\frac{3}{4}$ and $Gy=-\frac{3}{4}$) of the target pixel 812 and the bottom pixel 816 are less than the predetermined threshold ($Tg=-\frac{1}{3}$). Further, the vertical gradients ($Gy=0$ and $Gy=-\frac{1}{4}$) of the respective diagonal pixels 818 and 820 are greater than the predetermined threshold ($Tg=-\frac{1}{3}$). Thus, the edge detection result 852 for the input pixel 812 indicates that the South (S) edge is "ON". This type of processing is continued for the entire array 800 of pixels of FIG. 8A. Similarly, input pixel 814 has its East edge "ON" as indicated by "E" in result 854 in FIG. 8B.

The edge detection processing applied to pixel 816 determines that this pixel has zero edges that are "ON" as indicated by edge detection result 856 in FIG. 8B. Pixel 816 (black) has the same intensity as its right and bottom neighbouring pixels 824, 828, and therefore these edge sites are "OFF". However, the intensities of the top and left pixels 812, 814 (both white) are sufficiently different to that of the target pixel 816 so that the relevant intensity differences exceed the predetermined intensity threshold (Tf). The top pixel 812 and the target pixel 816 have adequate vertical gradients (Gy=–¾ and Gy=–¾) lower than the relevant vertical gradient threshold (Tg=–⅓). However, the relevant diagonal pixels 826, 830 are such that the vertical gradient (Gy=–½) of the diagonal pixel 826 is lower than the vertical gradient threshold (the gradient of diagonal 830 does satisfy the gradient requirement with Gy=¾). Thus, the North edge site is "OFF". The intensity of the left pixel 814 (white) also satisfies the intensity difference requirement for a West edge site and the horizontal gradients (Gx=–¾) of pixels 814 and 816 are lower than the predetermined threshold (Gx=–⅓). However, the relevant diagonal pixels 822, 830 are such that the horizontal gradient (Gx=–½) of the diagonal pixel 822 is lower than the horizontal gradient threshold (Gx=–⅓); the gradient of diagonal 830 does satisfy the gradient requirement with Gx=¾). Accordingly, the West edge site is also "OFF". Thus, all edges of target pixel 816 are "OFF".

With regards to pixel 824 as the target pixel, the left pixel 816 and the bottom pixel 830 have the same intensity (all black), and therefore the West and South edge sites are "OFF". In contrast, the top and right pixels 822, 832 are both white, and therefore the intensity difference exceeds the predetermined intensity threshold (Tf) in both cases. Further, the vertical gradients (Gy=–¾ and Gy=–¾) of the top pixel 822 and the target pixel 824 are lower than the predetermined vertical gradient threshold (Tg=–⅓), and the horizontal gradients (Gx=½ and Gx=½) of the right pixel 832 and target pixel 824 are greater than the gradient threshold (Tg=⅓). Also, the vertical gradients (Gy=½ and Gy=¼) of diagonal pixels 828, 836 in relation to the North edge site are greater than the vertical gradient threshold (Tg=–⅓), and the horizontal gradients (Gx=–¼ and Gx=–½) of diagonal pixels 812 and 828 in relation to the East edge site are lower than the horizontal gradient threshold (Gx=⅓). Thus, both the North and East edge sites of the target pixel 824 are "ON" as indicated by "NE" for edge detection result 858. Similar edge detection processing in accordance with FIGS. 6A–6C is carried out on the remaining pixels to yield the edge detection results 840.

Smoothing of the jagged line 802 of FIG. 8A is accomplished by turning some pixels to an intermediate colour or greyscale dependent upon the detected edge results 840 using the exemplary, specific filter of Table 3. The smoothing process of FIG. 7 is applied to the input data 800, where the applied smoothing is dependent upon the edge detection results 840 in accordance with Table 5. For example, input data pixel 810 has an edge detection result of "0", and the absolute values of the vertical and horizontal gradients (Gy=Gx=–¼) of pixel 810 are each less than the respective gradient threshold (Tg=⅓). Thus, no smoothing is applied to the target pixel 810 (per steps 702, 704 and 706 of FIG. 7), and the output value 880 of the smoothing processing is that of the input value (i.e., white) of pixel 810. The edge detection result 852 for input pixel 812 indicates that the South edge only is "ON", and therefore the single-edge, South convolution mask of Table 5 is applied to the pixel 812 (per steps 702, 712, 714 and 718 of FIG. 7). The top, left and right pixels of target pixel 812 are each white (1), and therefore the output result 882 (=⅓*3) is white. Likewise, smoothing processing for pixel 814 having the edge detection result 854 of "E" produces a white pixel (again, per steps 702, 712, 714 and 718 of FIG. 7) as output pixel 884.

Input data pixel 816 has an edge detection result 856 of "0", and the absolute values of the vertical and horizontal gradients (Gy=Gx=–¾) of pixel 816 are each lower than the respective gradient threshold (Tg=–⅓). Thus, full smoothing is applied to the target pixel 816 (per steps 702, 704, 708 of FIG. 7) using the convolution mask of Table 3. This produces an output greyscale value 886 of ½ (indicated by hatching in FIG. 8C). Input data pixel 824 as target pixel has an edge detection result 858 of NE. Thus, the double-edged, North-East convolution mask of Table 5 is applied to the neighbourhood of pixels around the target pixel 824 (per steps 702, 712, 716 and 718 of FIG. 7). Only pixels 816 and 830 (both of which are black) contribute to the output value 888 (=½*0). Thus, the output value 888 of this pixel 824 is black.

This smoothing process is carried out on all pixels 800 of FIG. 8A to produce the output pixels 870 of FIG. 8C having the smoothened diagonal line 892. As shown in FIG. 8C, the intensity of the hatched pixels is the average of the background and foreground colours. Thus, if the input image is black and white, the output image contains most likely greyscale values. The visual appearance of diagonal line 892 is significantly improved from the input diagonal line 802 in accordance with the edge detection and smoothing processes of the first embodiment.

2.4. Post-Processing to Preserve High-Contrast Textures

Figure 9A:
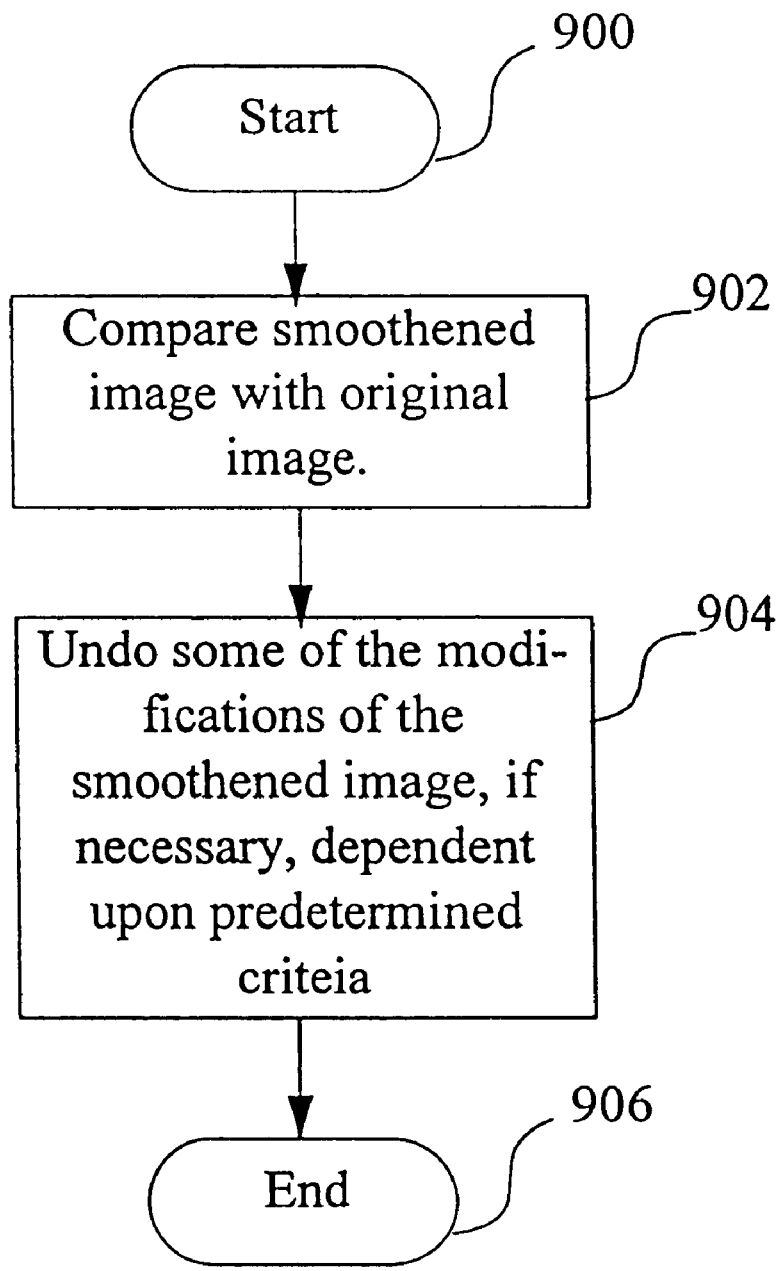
FIGS. 9A to 9D are flow diagrams of post-processing for subsequent halftoning of a smoothened image in accordance with the first embodiment.

The smoothing process of the first embodiment modifies high-contrast textures, like checkerboards or textures generated by a dithering process. The smoothened image can be post-processed to avoid this effect. FIG. 9A is a flow diagram illustrating generalised steps of post-processing in accordance with the first embodiment. Processing commences in step 900. The post-processing is based on comparing the smoothened image to the original image in step 902 and undoing some of the modifications caused by the smoothing method in step 904. Processing terminates in step 906. The smoothened image is scanned in raster order, and, for each target pixel, a limited neighbourhood of pixels is considered. The target pixels are the pixels having a colour that has been changed by the smoothing process. As described hereinafter with reference to FIGS. 9B to 9D, different kinds of post-processing can be considered.

Figure 9B:
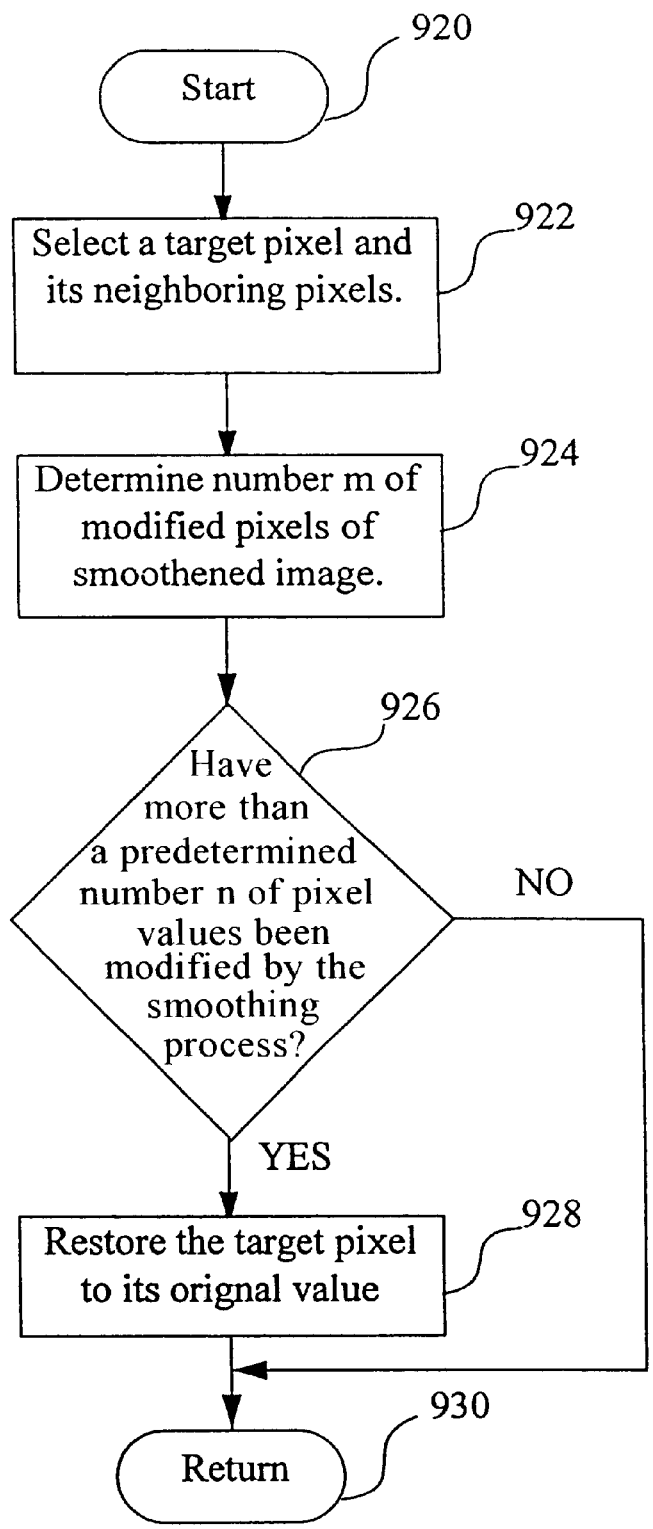

FIG. 9B is a flow diagram of a first post-processing method that limits the number of modified pixels in a restricted area. This process is applied to each target pixel (i.e., modified pixel value) in the smoothened image. For each target pixel, processing commences in step 920. In step 922, the target pixel and its neighbouring pixels are selected. In step 924, the number m of modified pixels in the predetermined neighbourhood centred on the target pixel of smoothened data is determined. In decision 926, a check is made to determine if more than a predetermined number n of pixel values have been modified by the smoothing process. If decision block 926 returns false (no), processing continues at step 930 and processing terminates. Otherwise, if decision block 926 returns true (yes), processing continues at step 928. In step 928, the target pixel is restored to its original input value. Processing then continues at step 930. Preferably, the number n of predetermined pixels is four. Thus, for each target pixel, if the number of modified pixels in the 3×3 neighbourhood is greater than 4, the original colour of the pixel is restored. Other values for the predetermined number n may be practiced without departing from the scope and spirit of the invention.

Figure 9C:
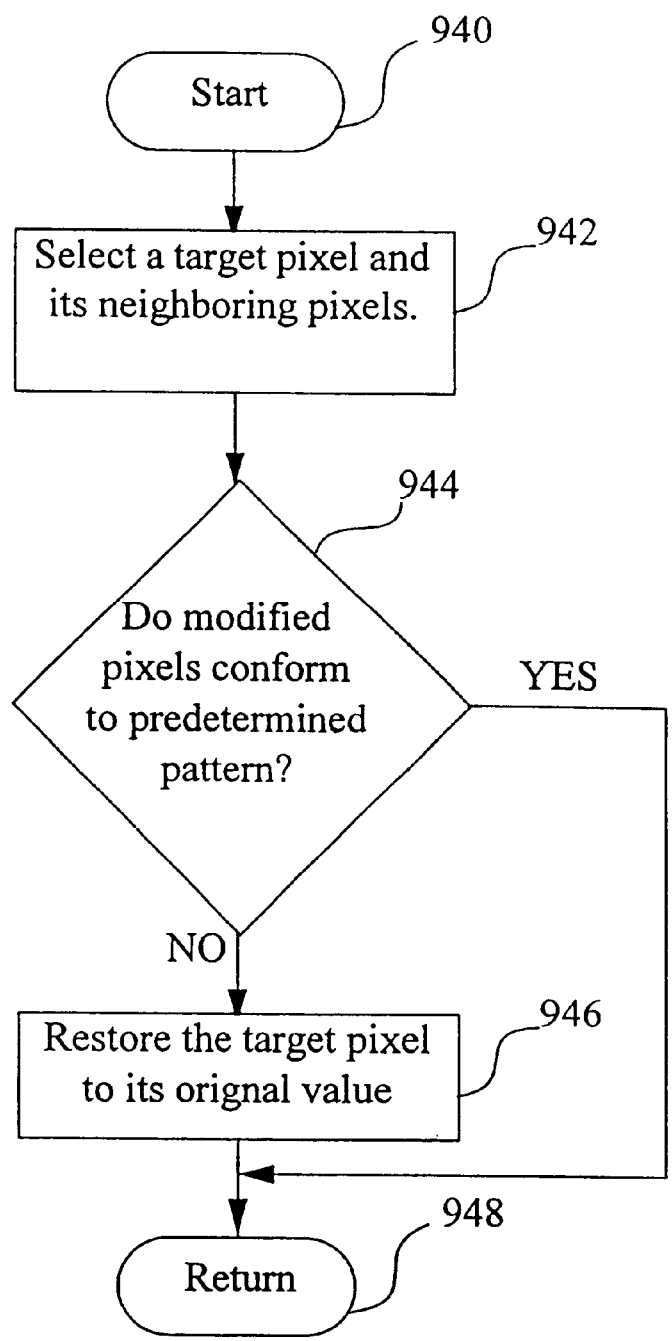
Figure 10A:
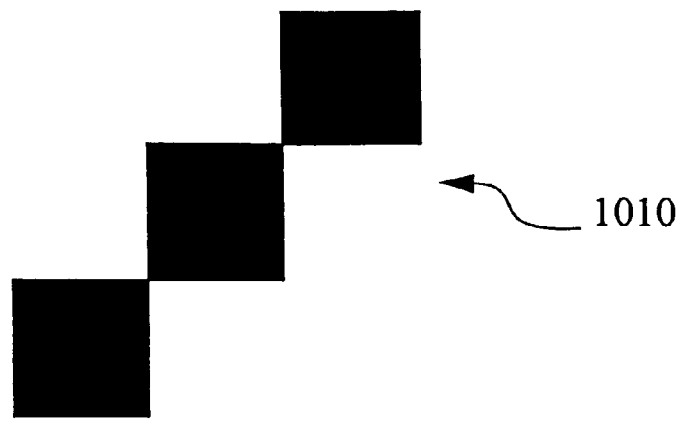
FIG. 10A shows patterns of modified pixels which can be allowed.
Figure 10A:
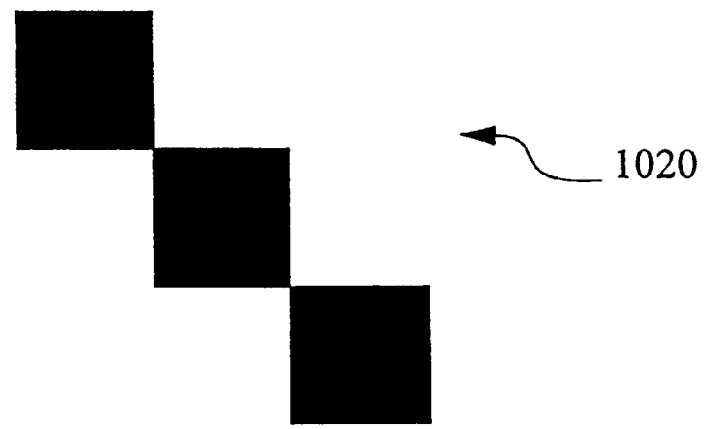
Figure 10A:
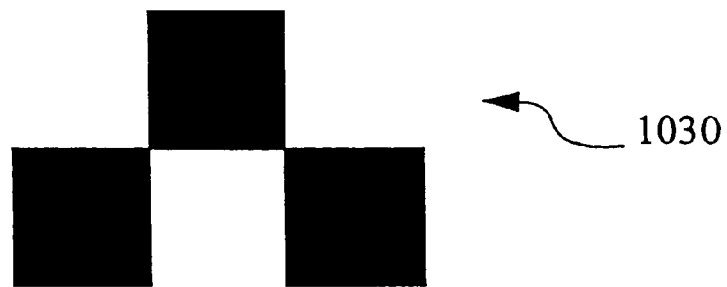

FIG. 9C is a flow diagram illustrating a further post-processing procedure. Processing commences in step 940 for each target pixel. In step 942, the target pixel and its neighbouring pixels are selected. In decision block 944, a check is made to determine if the modified pixels conform to a predetermined pattern. If decision block 944 returns true (yes), processing continues at step 948 and processing terminates. Otherwise, if decision block 944 returns false (no), processing continues at step 946. In step 946, the target pixel is restored to its original input value. Thus, the pattern of modified pixels in the smoothened can be considered as well. A change in a pixel value is allowed only if the modified pixels in the neighbourhood are ordered in a certain way. FIG. 10A shows examples of patterns 1010, 1020 and 1030 that may be allowed. The black pixels represent the locations of pixels in a 3×3 neighbourhood having values that are modified. Optionally, the process of FIG. 9C may be implemented in a modified form that is a combination of FIGS. 9B and 9C.

Figure 9D:
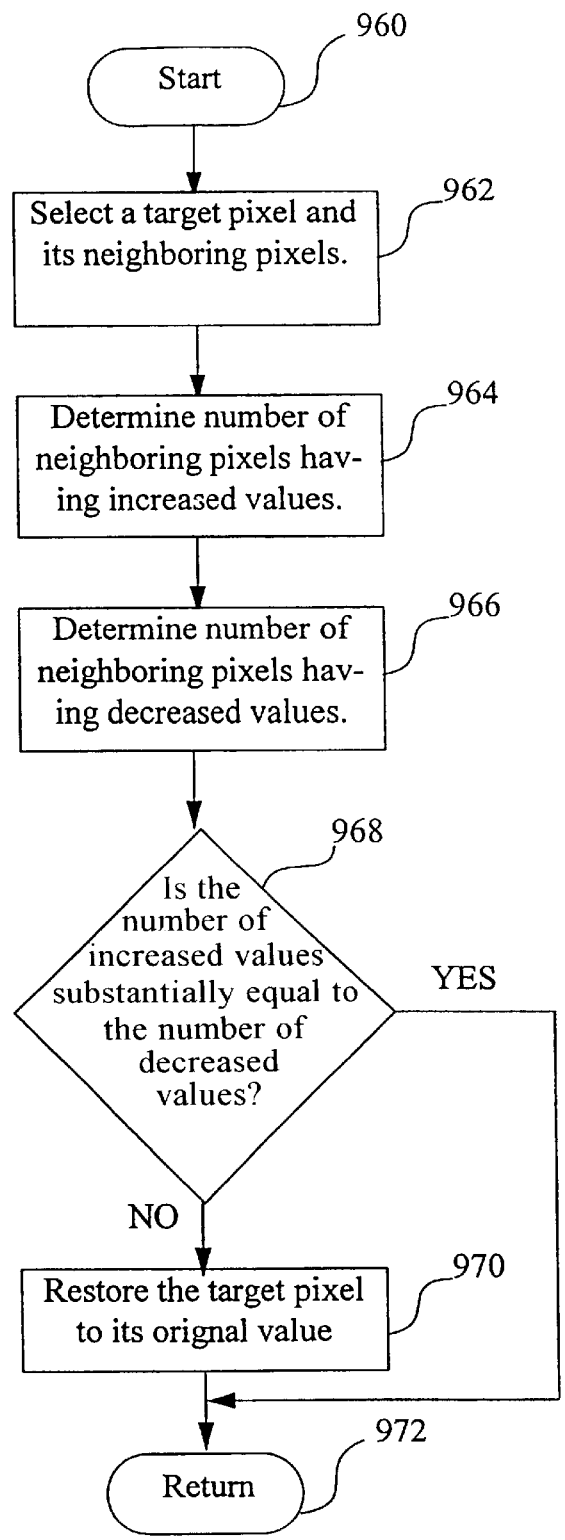
Figure 10B:
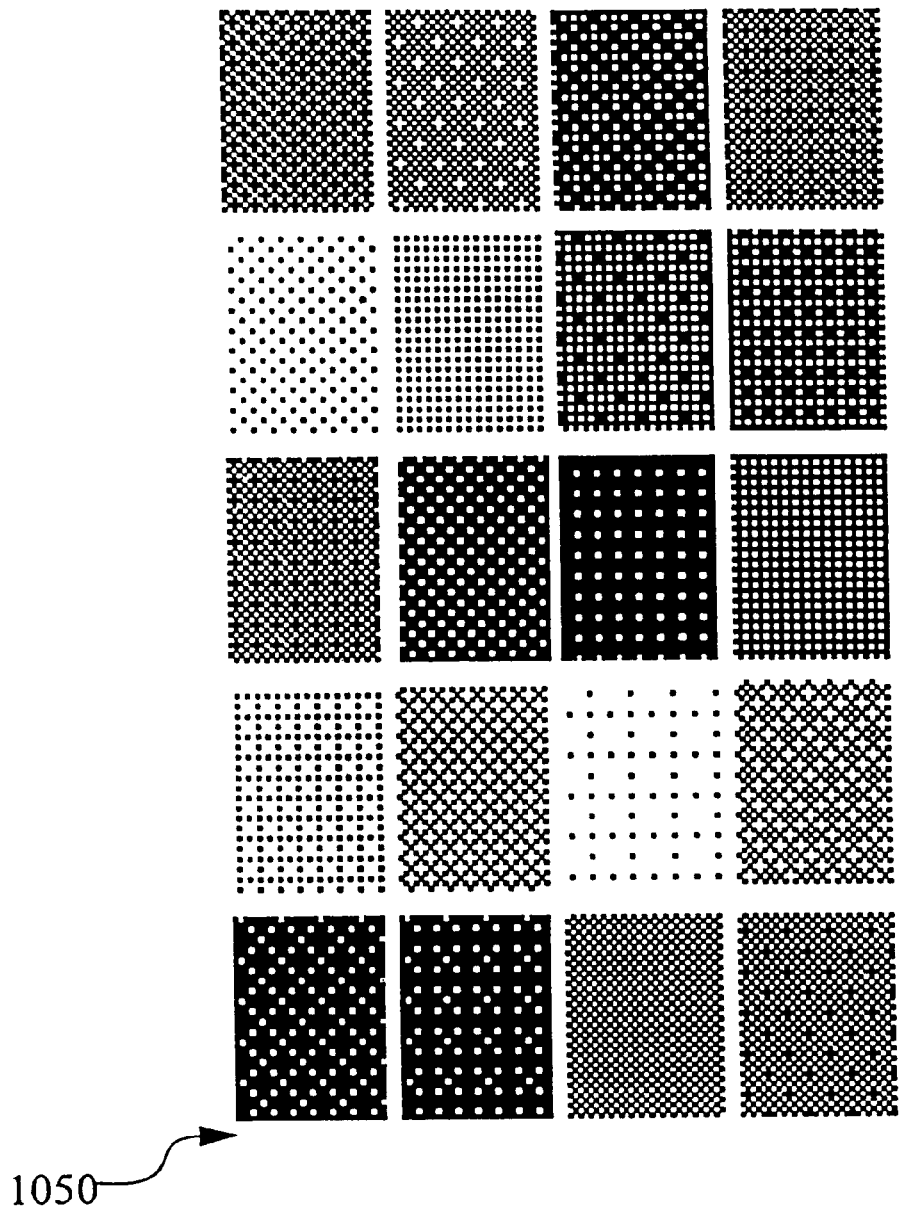
FIG. 10B illustrates high contrast textures of a dithered image which are preserved by the smoothing method.

A further post-processing method of the first embodiment aims at avoiding important changes in colour balance. FIG. 9D is a flow diagram illustrating this process. Processing for each target pixel commences in step 960. In step 962, the target pixel and its neighbouring pixels are selected. In step 964, the number of neighbouring modified pixels having increased values is determined. In step 966, the number of neighbouring modified pixels having decreased values is determined. In decision block 968, a check is made to determine if the number of increased pixel values is substantially equal to or equal to the number of decreased pixel values. If decision block 968 returns true (yes), processing continues at step 972 and terminates. Otherwise, if decision block 968 returns false (no), processing continues at step 970. In step 970, the original value of the target pixel is restored. Processing then continues at step 972. Thus, a pixel modification is accepted only if in its neighbourhood (e.g. 3×3 pixels) the number of pixels having increased values is almost equal to the number of pixels having decreased values (e.g., they differ by less than 2). FIG. 10B shows examples of textures that are preserved if the post-processing of FIG. 9D is applied.

3. Thickening Process of Second Embodiment

If the smoothened data is later optionally halftoned for display, the halftoning may cause a problem with the smoothened data by turning intermediate pixels to the background colour. Consequently, text and graphics can look thinner, and the smoothing effect may be less perceptible than before halftoning.

The second embodiment is a modification of the smoothing method according to the first embodiment and it produces a different smoothing effect. This smoothing method has been modified to deal with thin features in the input data. The process of the second embodiment aims at improving the appearance and readability of thin features by thickening them. Advantageously, the smoothing effect achieved by the process of the second embodiment is insensitive to posterior halftoning. However, the process relies on the assumption that the background intensity is greater than the foreground intensity (e.g. black text on a white background). The process can be readily modified to deal with the opposite case (i.e., when the background intensity is lower than the foreground intensity). Thus, the thickening method can be applied to arbitrary data provided minimal colour information is available. This second embodiment also describes a method to deduce whether the foreground is darker or brighter than the background.

3.1. Edge Detection Process

3.1.1. Gradient Computation and Thresholding

In the second embodiment, gradient computation and thresholding are performed as described hereinbefore in section 2.1.1 with reference to the first embodiment.

3.1.2. Edge Site Determination Process

The edge detection process of the second embodiment is substantially the same as that shown in FIGS. 6A and 6B. However, modifications are made to the flow diagram of FIG. 6C since different rules are applied to turn on edge sites. The edge sites are turned on if they belong to either a horizontal or vertical line regardless of the length of the line.

A vertical edge site is turned on if the following conditions are met:

A) the intensities of the two pixels surrounding the edge site (i.e., the target pixel and either the left or right pixel) are significantly different; and B) the horizontal gradient values of the two surrounding pixels are an absolute local maxima.

Again, referring to FIG. 4, a group of pixels 300 centred on a pixel 400 is shown including the surrounding pixels 400 and 402 that are considered for an eastern edge site 404.

Similarly, the horizontal edge site is turned on if the following conditions are met:

A) the intensities of the two pixels surrounding the edge site (i.e., the target pixel and either the top or bottom pixel) are significantly different; and B) the vertical gradient values of the two surrounding pixels are an absolute local maxima.

A more precise statement of the rules for detecting if edge sites are on is given in Table 6 (using the same naming conventions as the first embodiment).

TABLE 6

Rule 1: The EAST edge is "ON" if:
  (i)  $(abs((F(i,j) - F(i,j+1)) > Tf)$, AND
  (ii)  $((Gx(i,j) > Tg$ and $Gx(i,j+1) > Tg)$
    OR
    $(Gx(i,j) <- Tg$ and $Gx(i,j+1) <- Tg))$.
Rule 2: The NORTH edge is "ON" if:
  (i)  $(abs((F(i,j) - F(i-1,j)) > Tf)$
  (ii)  $((Gy(i,j) > Tg$ and $Gy(i-1,j) > Tg)$
    OR
    $(Gy(i,j) <- Tg$ and $Gy(i-1,j) <- Tg))$.
Rule 3: The WEST edge is "ON" if:
  (i)  $(abs((F(i,j) - F(i,j-1)) > Tf)$
  (ii)  $((Gx(i,j) > Tg$ and $Gx(i,j-1) > Tg)$
    OR
    $(Gx(i,j) <- Tg$ and $Gx(i,j-1) <- Tg))$.
Rule 4: The SOUTH edge is "ON" if:
  (i)  $(abs((F(i,j) - F(i,j+1)) > Tf)$
  (ii)  $((Gy(i,j) > Tg$ and $Gy(i,j+1) > Tg)$
    OR
    $(Gy(i,j) <- Tg$ and $Gy(i,j+1) <- Tg))$.

The process of determining or detecting special cases of double-edge pixels (referred to as "thickening pixels") is described hereinafter with reference to the smoothing process of the second embodiment.

3.1.3. Modified Portion of Edge Site Determination Process

Figure 11:
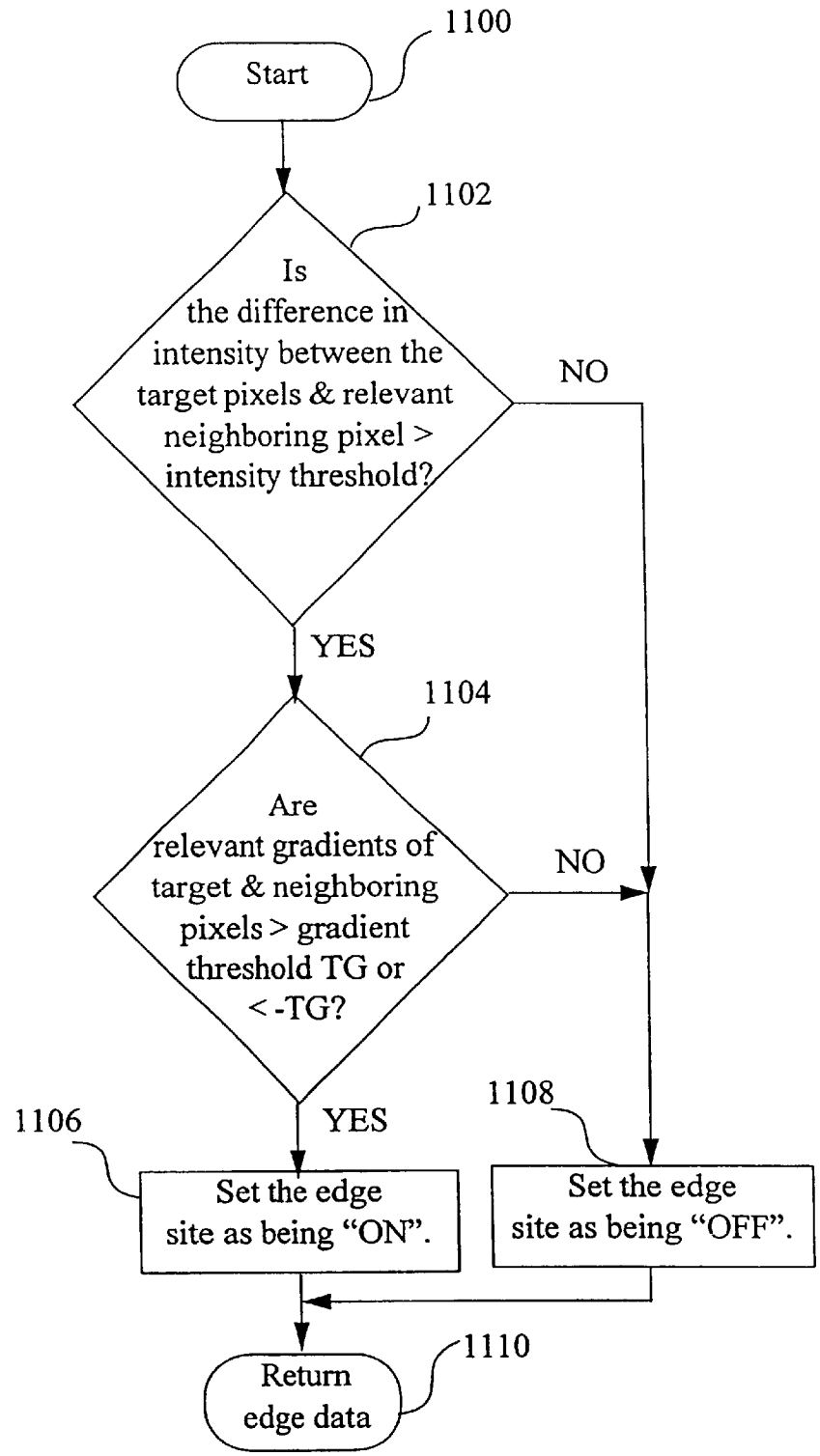
FIG. 11 is a flow diagram of the edge detection process, for use in combination with the processes of FIGS. 6A and 6B, in accordance with the second embodiment.

The edge detection process of the second embodiment includes the processes of FIGS. 6A and 6B, described hereinbefore, and the process of FIG. 11 to implement the rules of Table 6. FIG. 11 illustrates the generalised steps implemented in each of steps 634 to 640 of FIG. 6B.

Processing for each target pixel commences in step 1100. In decision block 1102, a check is made to determine if a difference between the intensity values of the target pixel and the relevant other surrounding pixel (i.e., right, top, left or bottom pixel for the East, North, West or South edge site, respectively) is greater than the predetermined intensity threshold Tf. Decision block 1102 implements sub-rule (i) of each of the rules of Table 6. If decision block 1102 returns false (no) indicating that the absolute value of the intensity different is not greater than the threshold intensity, processing continues at step 1108. In step 1108, the respective edge of the target pixel for the selected colour component is set to "OFF". Processing then continues at step 1110 and the edge data is returned to the calling procedure.

If decision block 1102 returns true (yes), processing continues at decision block 1104. In decision block 1104, a check is made to determine if the relevant gradients (i.e., the horizontal or vertical gradient) of the target pixel and the respective other surrounding pixel (i.e., right, top, left or bottom pixel) are either greater than the gradient threshold or less than the negative value of the gradient threshold. This check implements sub-rule (ii) of Table 6. If decision block returns false (no), processing continues at step 1108 as described hereinbefore. Otherwise, if decision block 1104 returns true (yes), processing continues at step 1106. In step 1106, the respective edge (i.e., East, North, West or South) of the target pixel is set as "ON". Processing then continues at step 1110. While the flow diagrams of FIGS. 6A, 6B and 11 illustrate specific steps and ordering of steps, it will again be apparent to one skilled in the art that modifications and/or changes to the particular steps and/or ordering of steps can be made to the edge detection process of the second embodiment without departing from the scope and spirit of the invention.

3.2. Smoothing Process

The thickening process of the second embodiment aims at smoothing jagged lines by turning certain background pixels to the foreground colour, instead of introducing intermediate colour or grey levels as is done in the antialiasing version of the first embodiment. Background pixels that are turned to the foreground pixels by this thickening process are referred to hereinafter as thickening pixels.

3.2.1. Thickening Pixel Determination Rules

Thickening pixels are some of the double-edged pixels (i.e., north-east, north-west, south-east, south-west) that belong to thin lines. They can be distinguished from the other double-edge pixels by checking the following conditions set forth in Table 7.

TABLE 7

| NORTH-EAST: | Gx(i−1,j+1) <− Tg | and | Gy(i−1,j+1) > Tg |
| NORTH-WEST: | Gx(i−1,j−1) > Tg | and | Gy(i−1,j−1) > Tg |
| SOUTH-EAST: | Gx(i+1,j+1) <− Tg | and | Gy(i+1,j+1) <− Tg |
| SOUTH-WEST: | Gx(i+1,j−1) > Tg | and | Gy(i+1,j−1) <− Tg |

In Table 7, (i,j) are the coordinates of a target pixel that has two adjacent edge sites turned on. The same naming conventions are used as in the process of the first embodiment. The target pixel is a candidate thickening pixel if the conditions set forth in Table 7 are true. Otherwise, the pixel is a standard double edge, which is processed in accordance with rule 3 of Table 4.

3.2.2. Modified Smoothing Process for Thickening Pixels

The smoothing filter (e.g., the filter of Table 3) is modified according to the results of the edge detection in accordance with rules 2 and 3 of Table 4, except for the thickening pixels. Using the same naming conventions, for the thickening pixels, the smoothing filter values which are different from the classical smoothing filter are set forth in Table 8.

TABLE 8

| SOUTH-WEST: | Va= Vb = Vc = Vf = Vi = 0 and N = Vd + Ve + Vg + Vh |
| SOUTH-EAST: | Va = Vb = Vc = Vd = Vg = 0 and N = Ve + Vf + Vh + Vi |
| NORTH-WEST: | Vc = Vf = Vg = Vh = Vi = 0 and N = Va + Vb + Vd + Ve |
| NORTH-EAST: | Va = Vd = Vg = Vh = Vi = 0 and N = Vb + Vc + Ve + Vf |

The convolution masks for the thickening pixels are set forth in Table 9.

TABLE 9

$$1/2 \begin{array}{|c|c|c|} \hline 0 & 0 & 0 \\ \hline 1 & 0 & 0 \\ \hline 0 & 1 & 0 \\ \hline \end{array} \quad 1/2 \begin{array}{|c|c|c|} \hline 0 & 0 & 0 \\ \hline 0 & 0 & 1 \\ \hline 0 & 1 & 0 \\ \hline \end{array}$$

SOUTH-WEST    SOUTH-EAST $$1/2 \begin{array}{|c|c|c|} \hline 0 & 1 & 0 \\ \hline 1 & 0 & 0 \\ \hline 0 & 0 & 0 \\ \hline \end{array} \quad 1/2 \begin{array}{|c|c|c|} \hline 0 & 1 & 0 \\ \hline 0 & 0 & 1 \\ \hline 0 & 0 & 0 \\ \hline \end{array}$$

NORTH-WEST    NORTH-EAST

The effect of the convolution masks for the thickening pixels stated in Table 9 is apparent when compared with the convolution masks for the respective double edges stated in Table 5 for the standard or normal case (i.e., non-thickening cases). The convolution masks for this exemplary filter are applied to the target pixel and its neighbourhood of pixels dependent upon the presence of predetermined "thickening" pixels, in addition to the number and particular combination of edge sites detected as "ON".

3.2.3. Flow Diagram of Smoothing Process

Figure 12:
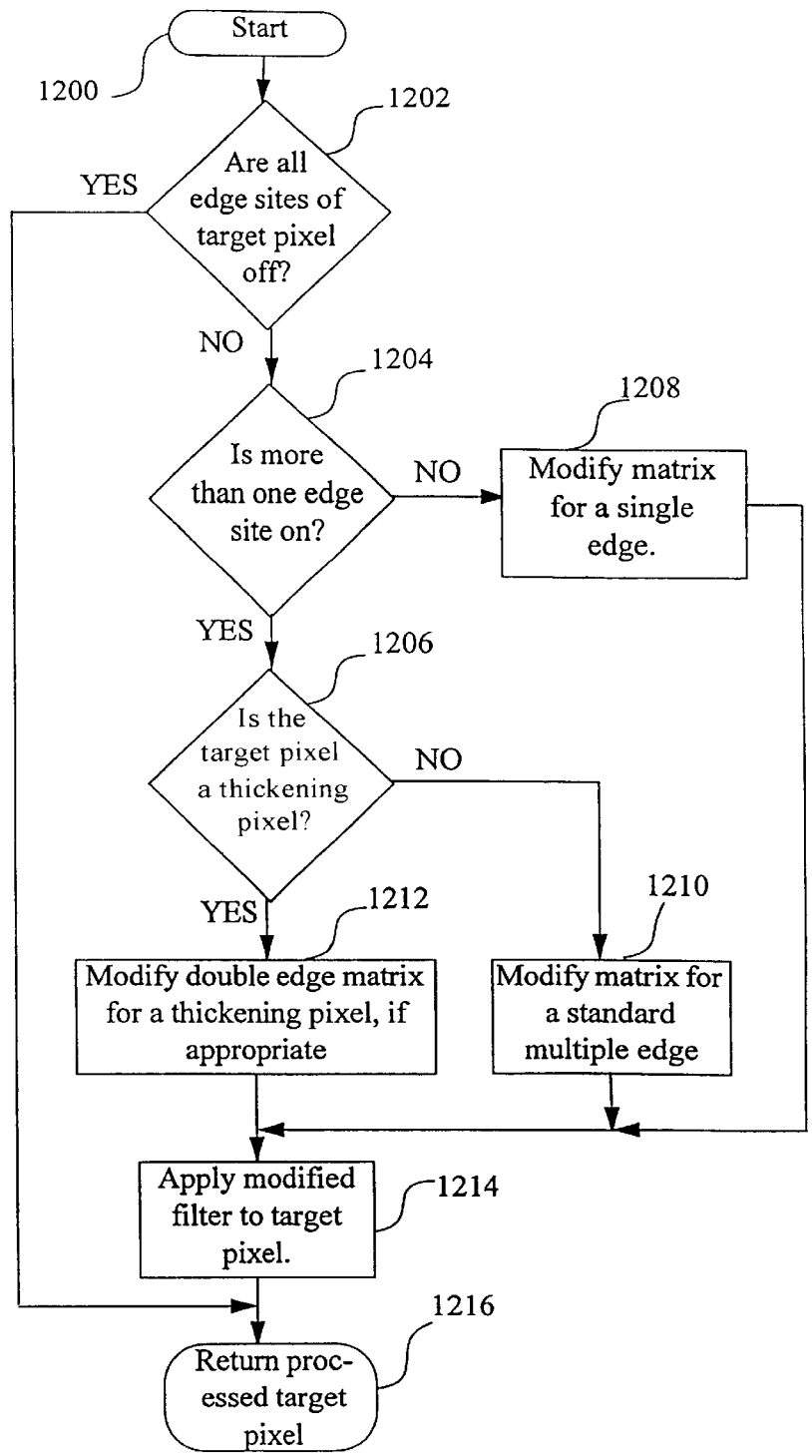
FIG. 12 is a flow diagram illustrating the smoothing process in accordance with the second embodiment.

FIG. 12 is a flow diagram providing an overview of the process of smoothing edges contained in image data in accordance with the second embodiment. The process of FIG. 12 is preferably used to implement step 620 of FIG. 6A for applying smoothing to a target pixel dependent upon edge data.

The process of FIG. 12 is illustrated for the processing of a single target pixel. However, as described hereinbefore with reference to FIG. 7, this process can be readily repeated using stored edge data as a post edge detecting process.

Processing commences in step 1200. In decision block 1202, a check is made to determine if all of the edge sites of the target pixel are "OFF". If decision block 1202 returns true (yes), processing continues at step 1216 and the processed target pixel is returned. In this case, the value of the processed target pixel is equal to its input value. Otherwise, if decision block 1202 returns false (no), processing continues at decision block 1204. In decision block 1204, a check is made to determine if more than one edge site is "ON". If decision block 1204 returns false (no), processing continues at step 1208. In step 1208, the convolution mask is modified for a single edge in accordance with rule 2 of Table 4. Processing then continues at step 1214. In step 1214, the modified filter is applied to the target pixel. In step 1216, the processed target pixel produced by step 1214 is returned to the calling process.

Otherwise, if decision block 1204 returns true (yes) indicating the target pixel has at least two "ON" edge sites, processing continues at decision block 1206. In decision block 1206, a check is made to determine if the target pixel is a thickening pixel in accordance with the rules of Table 7 for North-East, North-West, South-East, and South-West cases. If decision block 1206 returns false (no), processing continues at step 1210. In step 1210, the filter is modified for a "standard" (i.e., normal case) double edge site in accordance with the rule 3 of Table 4. In the case that the exemplary filter of Table 3 is used, the filter is modified so as to produce or use the respective double-edge convolution mask of Table 5. Processing then continues at step 1214, as described hereinbefore. Otherwise, if decision block 1208 returns true (yes) indicating a thickening pixel, processing continues at step 1212. In step 1212, the filter is modified in accordance with the rules of Table 8. For the case of the exemplary filter of Table 3, the convolution masks of Table 9 are produced or used. Processing then continues at step 1214, as described hereinbefore. Thus, the process of FIG. 12 applies modified convolution masks to the target pixel and its neighbourhood of pixels dependent upon the presence of predetermined "thickening" pixels, in addition to the number and particular combination of edge sites detected as "ON".

3.2.4. Example of Edge Detection and Smoothing Process

Figure 13A:
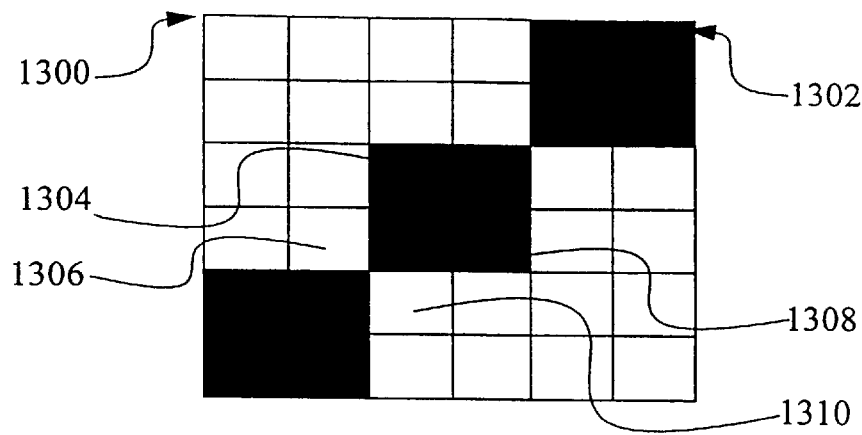
FIGS. 13A to 13C illustrate the effect of the smoothing method described in the second embodiment on a diagonal line.
Figure 13B:
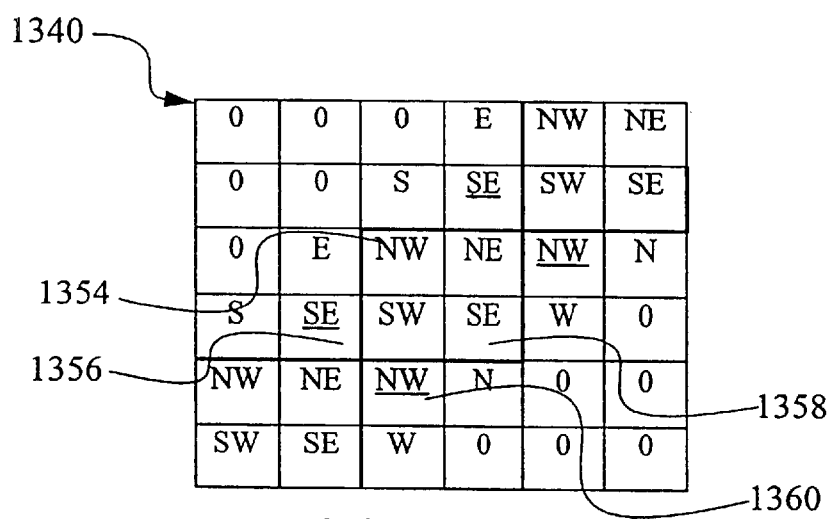
Figure 13C:
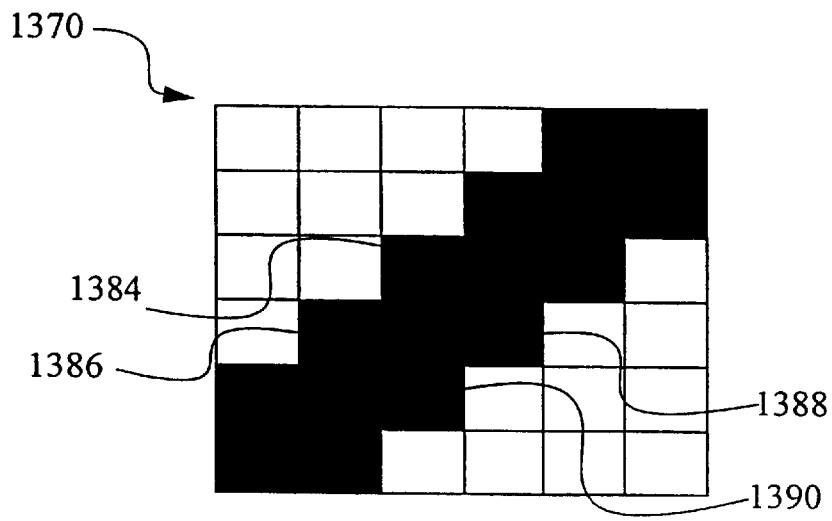

FIG. 13A is a block diagram of an array 1300 of input pixels containing a jagged or unsmoothed diagonal line 1302 having a slope of 45 degrees. This pixel array 1300 is identical to the array 800 of FIG. 8A. The processing of a number of pixels 1304–1310 is described in terms of the edge detection process of FIGS. 6A, 6B and 11 and the smoothing process of FIG. 12. The processing is applied to the entire array 1300, but is only described with reference to certain pixels for the purpose of brevity. The edge detection results 1340 and the smoothed image data 1370 are shown in FIGS. 13B and 13C, respectively. The results of the edge detection process are described with particular reference to results 1354–1360 for pixels 1304–1310, respectively, to point out the effect of thickening pixels in the smoothing process of the second embodiment. The edge detection rules of Table 6 for the second embodiment produces substantially the same results as those obtained in FIG. 8B for the first embodiment, except the diagonal row of pixels above and below the central diagonal result line (e.g. result 856 above the central diagonal line containing result 858) having "ON" edge values of "0" in FIG. 8B now have double edge combinations (e.g. 1354 and 1356 above the central diagonal, and 1358 and 1360 below) in FIG. 13B.

Figure 14A:
FIGS. 14A and 14B illustrate the effect of smoothing on "English" characters according to the second embodiment of the invention.
Figure 14B:
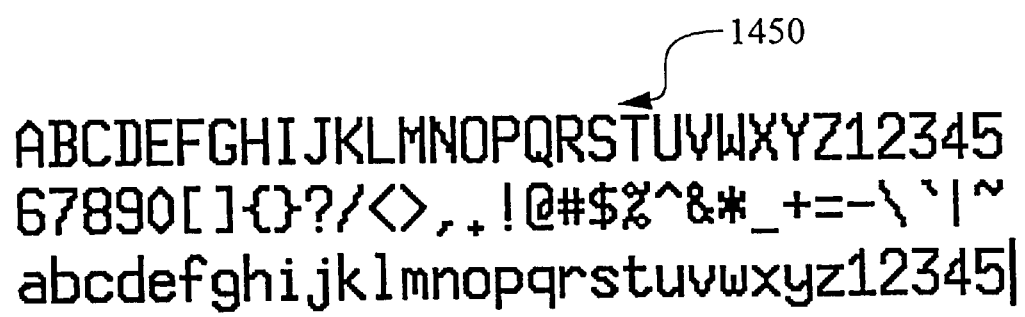

Edge detection results 1354 and 1358 (i.e., NW and SE) above and below the central diagonal line are determined to be standard or normal double-edge sites in accordance with the process of FIG. 11 and the rules of Table 6 and since they do not satisfy the thickening rules of Table 7. In contrast, the double-edge site results 1356 and 1360 (i.e., NW and SE) satisfy the relevant thickening rules of Table 7 and therefore are thickening pixels, as indicated by underlining in FIG. 13B. In accordance with steps 1202, 1204, 1206, 1210 and 1214, the standard double edge results 1354 and 1358 causes pixels 1304 and 1308 to be smoothed using the convolution mask for NW and SE edges in accordance with Table 5. In contrast, the thickening results 1356 and 1360 cause pixels 1306 and 1310 to be smoothed in accordance with the respective modified convolution masks of Table 9. The differing effects between standard and thickening double-edge sites is readily determined by comparing the convolution masks for NW, SW, SE, and NE edge sites of Table 5 with the masks for NW, SW, SE, and NE sites in Table 9. The effect of smoothing for thickening pixels is to convert the background colour (white) of input pixels 1306 and 1310 to the foreground colour (black) for output pixels 1386 and 1390 of the output array 1370. In contrast, the standard double-edge input pixels 1304 and 1308 have the same foreground colour in the respective output pixels 1384 and 1388. Thus, with the specific filter chosen, smoothing of the jagged line in accordance with the process of the second embodiment is accomplished by turning some pixels that belong to the background to the foreground colour, with those pixels corresponding to cases of thickening double edges FIG. 14A illustrates English language text 1400 input to the edge detection and smoothing process of the second embodiment. FIG. 14B shows the thickened output text 1450 in accordance with the second embodiment.

Figures 15C, 15D:
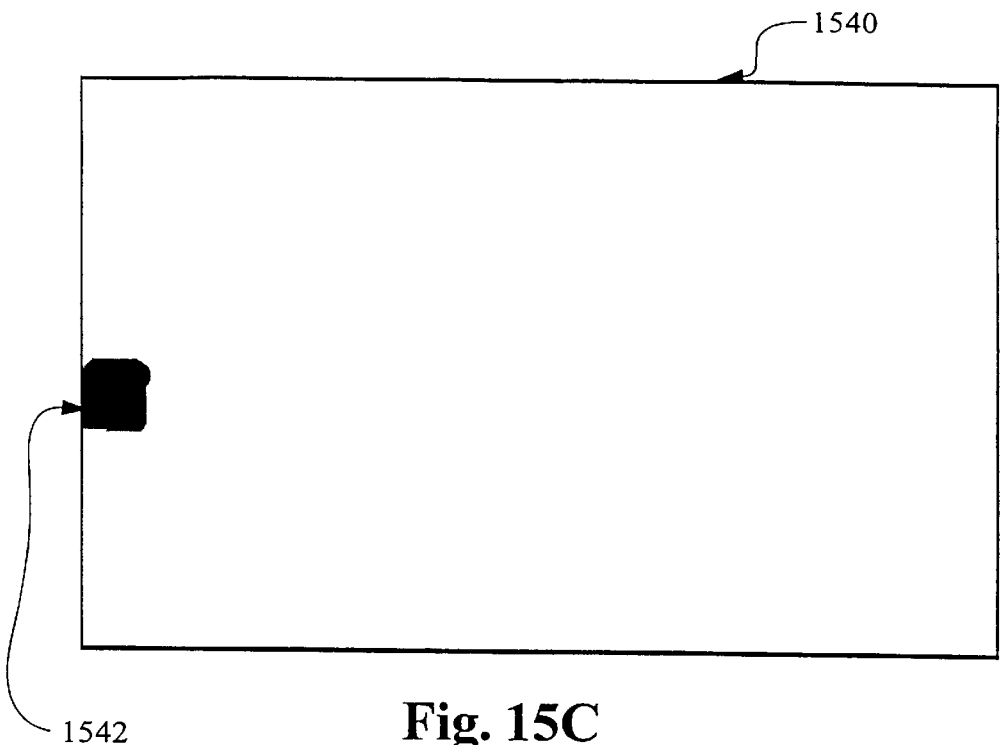

Likewise, FIGS. 15A to 15D show illustrative results obtained using Japanese language text. FIG. 15A illustrates input text 1500 where the jagged edges of the text are readily apparent. The background colour is primarily white, and the foreground colour of the text is black. However, in contrast, one of the characters 1502 has a black background and the text is white, thereby presenting a special case requiring a variation of the process of the second embodiment. FIG. 15B illustrates the thickened output text 1520 produced in accordance with the process of the second embodiment (without colour detection being performed). This process has resulted in the "reversed" or inverted colour character 1520 becoming more jagged. In FIG. 15C, the region 1542 containing the reversed character is selected from the text region 1540 for separate processing. This is done by zone mapping the input text using colour detection. The process of zone mapping is described hereinafter with reference to FIGS. 14 and 15. In the zone map, white areas correspond to a first type of pixel (A) with white background and black foreground. The dark area 1542 is a second type of pixel (B) having opposite colour characteristics. For the case where the background colour is less intense than the foreground colour, the same processes of the second embodiment are applied but with all signs of gradients negated. FIG. 15D illustrates the output text 1560 containing the thickened output 1562 produced by this variation of the second embodiment (involving colour detection). The overall appearance and readability of the text is improved even if individual letters are not always improved.

The smoothing algorithm only modifies thin (ie., two-pixel wide) lines. Wider staircases are left unchanged. With the chosen filter, no intermediate value is introduced and the modifications to the data are unlikely to be cancelled by any subsequent halftoning procedure. This smoothing method is particularly suitable for small features, because it makes them appear thicker.

3.2.5. Process of Preserving High Contrast Textures

Figure 16:
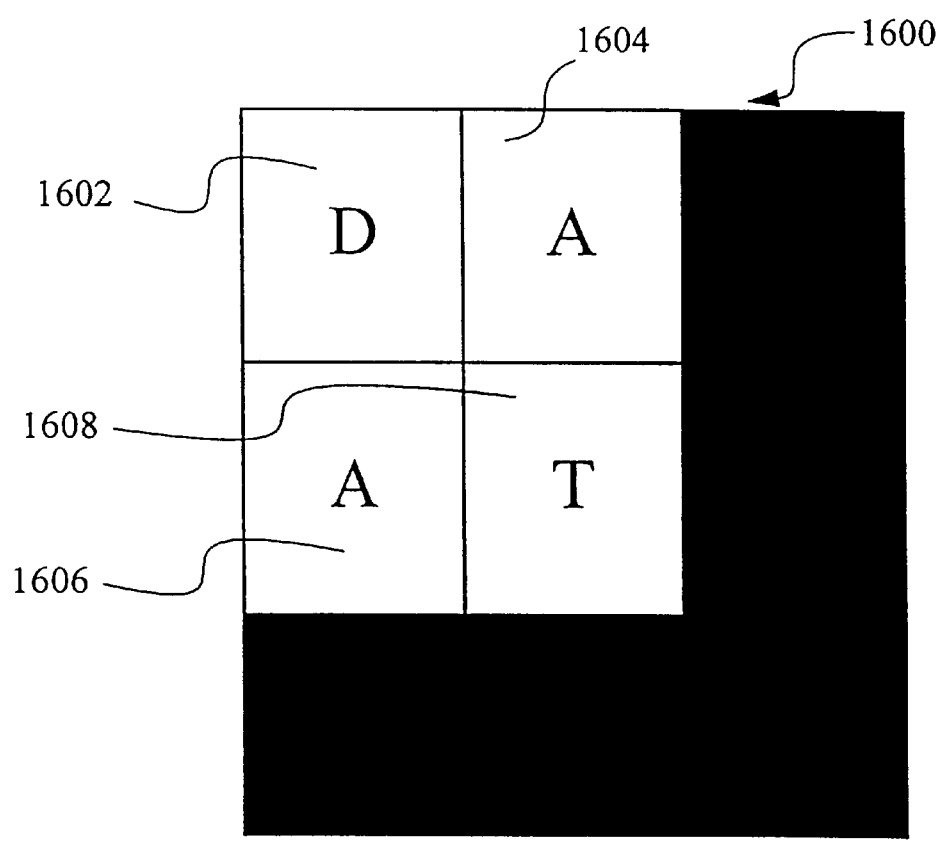
FIG. 16 shows a pixel thickening an oblique line and its neighbours.

If applied as described hereinbefore, the thickening method may adversely affect high contrast textures more than the antialiasing method of the first embodiment. However, it is possible to minimise texture modifications. The preserving process comprises the step of limiting the number of thickening pixels in each 2×2 array of pixels. For each thickening candidate pixel, if other background neighbouring pixels are also candidates for thickening, none of them is turned to the foreground colour. This process can be limited to considering only diagonal neighbours or adjacent and diagonal neighbours in the array 1600 shown in FIG. 16. Pixel 1608 (T) is the pixel in the 2×2 array 1600 likely to be thickened. Pixel 1602 (D) is a diagonal neighbour, and pixel 1604 and 1606 (A) are adjacent neighbours.

Figure 20:
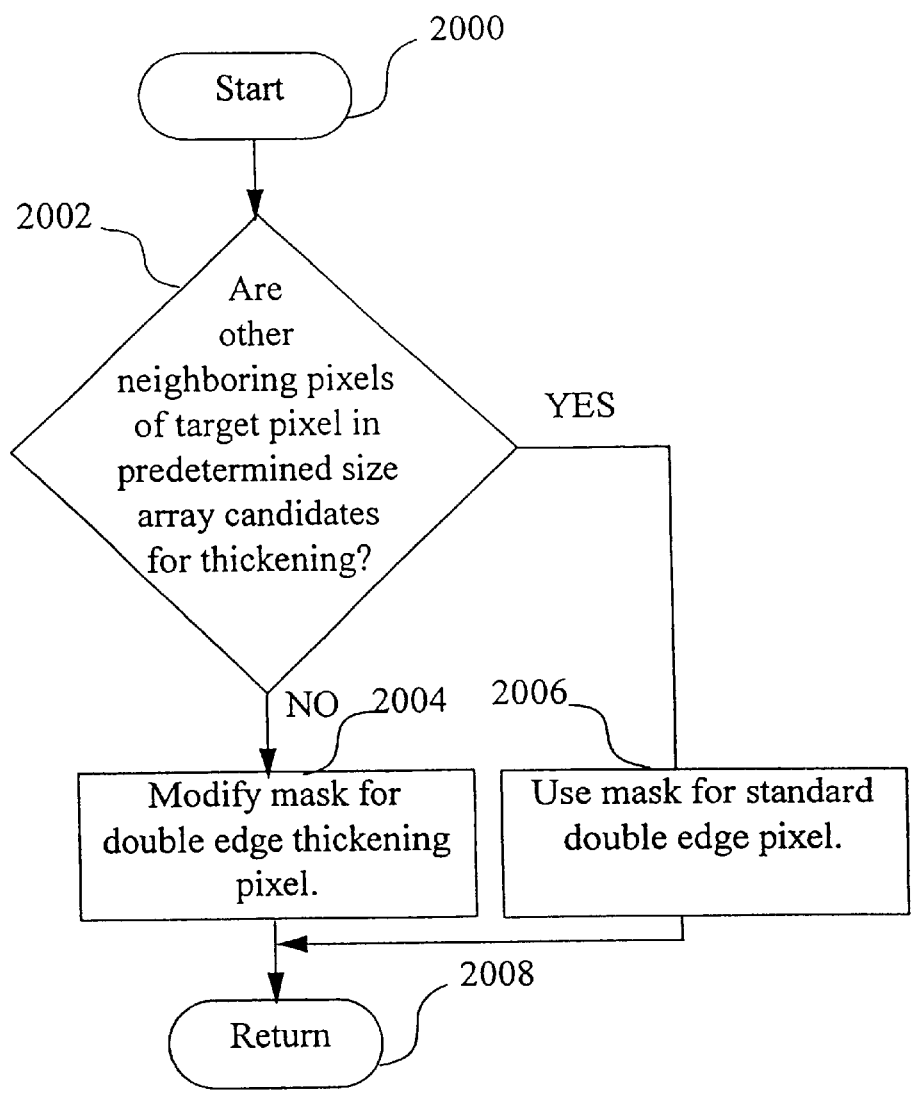
FIG. 20 is a flow diagram illustrating a variation of the process of smoothing thickening candidate pixels in accordance with the second embodiment.

The smoothing process of the second embodiment shown in FIG. 12 can be modified to implement this variation. In particular, FIG. 20 is a flow diagram illustrating the detailed sub-steps of step 1212 of FIG. 12 to carry out this texture preserving process. The processing of FIG. 12 is carried out as described hereinbefore, except a number of sub-steps are carried out for step 1212. When processing is carried out for step 1212, the texture processing commences in step 2000. In decision block 2002, a check is made to determine if there are other pixels of the target pixel in the predetermined size array that are candidates for thickening. If decision block 2002 return false (no), processing continues at step 2004. In step 2004, the double-edge convolution matrix is modified for a thickening pixel. Processing then continues at step 2008, where it returns to the calling process. Otherwise, if decision block 2002 returns true (yes), processing continues at step 2004 and a standard double-edge mask is applied, but no thickening. Again processing terminates at step 2008.

FIG. 10B shows examples of dithered textures that are not modified by the thickening method if the number of thickening pixels per 2×2 pixel array is limited.

3.2.6 Process of Colour Detection

FIG. 15A illustrates the effect of simply applying the second embodiment, where a character 1502 is inverted (ie., white text on a black background). However, if the background is darker than the foreground, the thickening process can be applied successfully if all the gradient signs are changed. Thus, the problem can be eliminated by providing the smoothing process with minimal colour information (ie., detecting whether the foreground is darker or brighter than the background). Inverted text is often found on PC screens, for example, when text is selected in an editing application. More generally, input data for the smoothing process can contain any text colour on any background colour, with few or many transitions. For example, such circumstances are often encountered in most pages found on the World Wide Web (WWW).

The process of introducing additional colour information involves zone segmenting an image. The zone-segmentation method of this embodiment distinguishes three types of zones:

1) areas where dark features are in a minority;
2) areas where bright features are in a minority; and
3) areas where dark and bright features are equally represented.

The three types of zones may be present in the same image, with horizontal or vertical transitions.

The zone detection process is based, for example, on local statistics computed on the luminance image. In the exemplary case of using the RGB colour model, the luminance of each pixel is obtained using the following formula: $L=0.299*R+0.587*G+0.114*B$. In the process, each pixel is classified depending on the luminance distribution in its neighbourhood (ie., depending on the relative importance of dark and bright pixels). The local statistics used are preferably the mean, the minimum and the maximum value of luminance in a predetermined neighbourhood. However, other statistics characterising the luminance histogram may be used (e.g., the median) without departing from the scope of the invention.

Figure 17A:
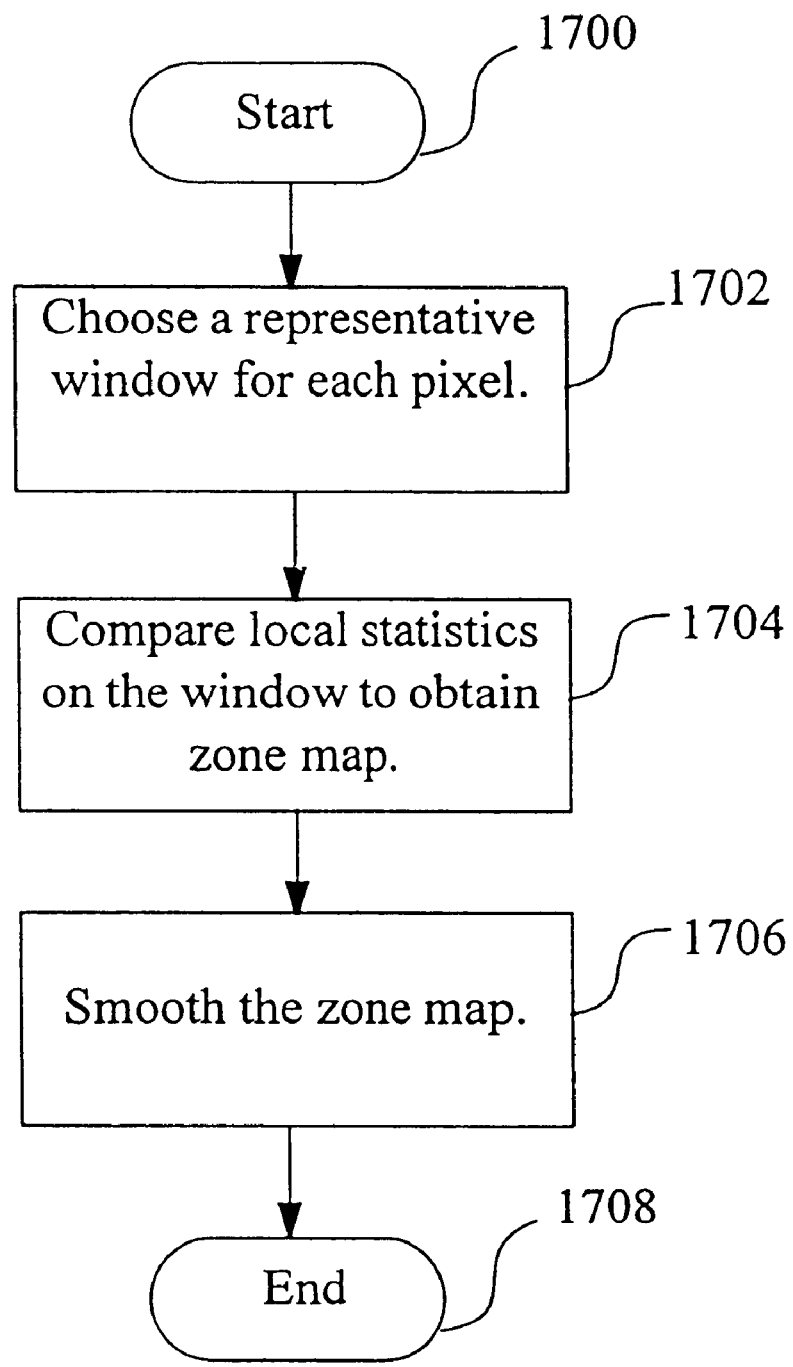
FIGS. 17A to 17D illustrate the colour detection process according to the embodiments of the invention.

FIG. 17A is a flow diagram of the zone segmentation method of the third embodiment, showing the generalised steps of this process. The process comprises three fundamental steps (1702, 1704, 1706). Processing commences in step 1700. In step 1702, a representative window is chosen for each pixel (i.e., transitions are detected). In step 1704, local statistics determined for the window are compared to obtain a zone map. In step 1706, the zone map is smoothed.

The first step 1702 involves determining a representative window in the neighbourhood of each pixel. Choosing a reference window so that the target pixel is the centre of the window may induce errors when the target pixel is located near a zone transition. A homogeneous reference window can be selected for each pixel by comparing different adjacent windows. A similarity criterion must be defined for window comparison. For example, two windows may be considered similar if their local statistics are similar (i.e., the absolute difference between their respective minimum, maximum and mean values is smaller than fixed thresholds).

Figure 17B:
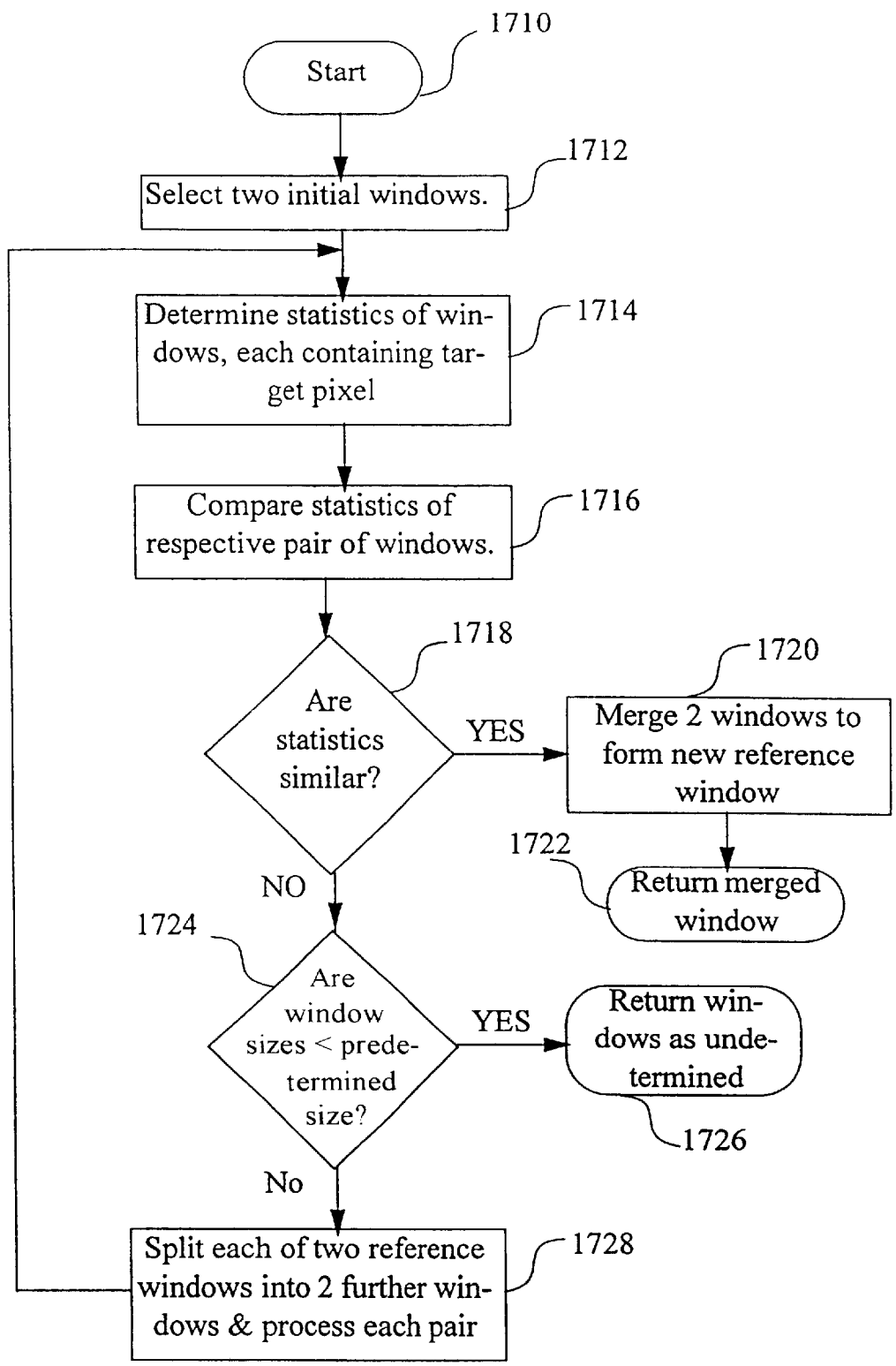

FIG. 17B is a flow diagram illustrating preferred substeps of step 1702 in greater detail. Processing commences in step 1710. In step 1712, two initial windows are selected for processing, each containing the target pixel centred on a relevant transition. The transition may be either a vertical or horizontal one. In step 1714, statistics of each of the selected windows containing the target pixel are determined. In step 1716, the statistics of the respective pair of windows are compared. In decision block 1718, a check is made to determine if the statistics are similar. If decision block 1718 returns true (yes), processing continues at step 1720. In step 1720, the two windows are merged together to form a new reference window. In step 1722, the merged window is returned.

Otherwise, if decision block 1718 returns false (no), processing continues at decision block 1724. In decision block 1724, a check is made to determine if the size of each of the windows is less than a predetermined size. If decision block 1724 returns true (yes), processing continues at step 1726. In step 1726, no reference windows are determined and processing returns to the calling process. Otherwise, if decision block 1724 returns false (no), processing continues at step 1728. In step 1728, each of the two currently selected windows is split or divided into two further windows. Each pair of these windows is in turn processed. Processing then continues at step 1714.

An example of this processing is illustrated in FIGS. 18A to 18E for the case of vertical transitions being detected. Two windows 1810 and 1812 on the left and right of a target pixel 1800 in FIGS. 18A and 18B, respectively, are compared (per step 1716 of FIG. 17B). Each of the windows is configured to include the target pixel 1800. If they are similar, both windows 1810 and 1812 are merged to form a reference window 1820, shown in FIG. 18C, for the centre pixel 1800 (per steps 1718, 1720 and 1722).

Figure 18A:
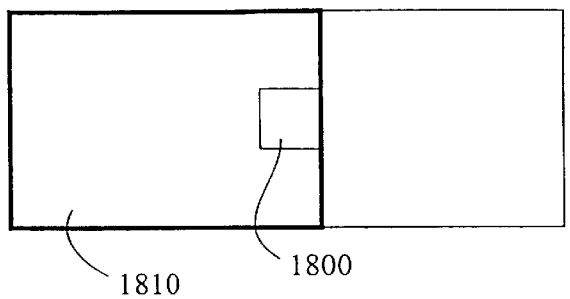
FIGS. 18A to 18E are block diagrams illustrating the detection of an exemplary vertical transition using the colour detection process of FIGS. 17A–17D.
Figure 18B:
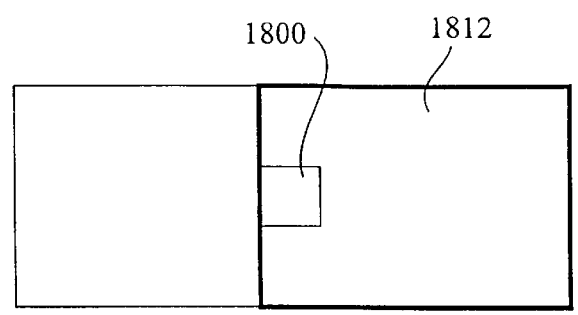
Figure 18C:
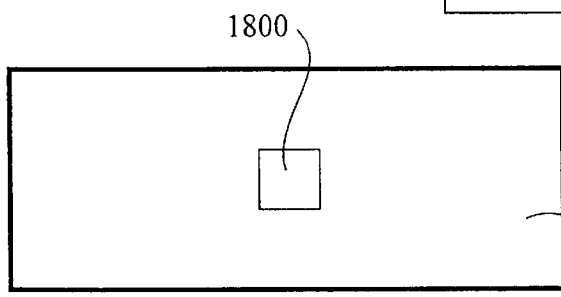
Figure 18D:
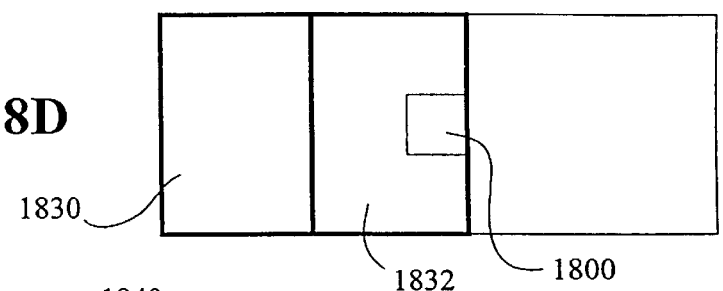
Figure 18E:
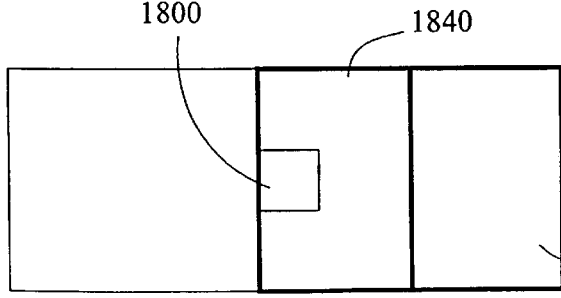

Otherwise, both windows 1810, 1812 are each split into two equal windows. That is, the window 1810 is split into a left window 1830 and a right window 1832 shown in FIG. 18D, and the window 1812 is split into a left window 1840 and a right window 1842 shown in FIG. 18E (per steps 1724 and 1728). If windows 1830 and 1832 are sufficiently similar, their reunion 1810 of FIG. 18A is considered as the reference window for the target pixel 1800. If windows 1840 and 1842 are similar enough, their reunion 1812 is considered as the reference window for the target pixel 1800. Otherwise, if none of the windows can be chosen, the whole procedure is repeated on smaller windows. For instance, right window 1832 is used instead of window 1810, and window 1840 instead of window 1812. The procedure starts with a chosen window size and stops when a reference window has been determined, or when the current window size becomes inferior to a selected minimal size (per steps 1724 and 1726). Horizontal transitions are detected in a similar fashion, by replacing the left and right windows with top and bottom windows.

In relation to step 1704, the zone segmentation is based on comparing the mean luminance to the minimum and maximum luminance of the reference window and relies on two thresholds. The variables Min, Max, LT and HT are the minimum and maximum luminance and the lower and higher threshold, respectively. The lower and higher thresholds LT and HT may be chosen using a percentage of the luminance range:

$$LT = Min + pct*(Max-Min), \text{ and}$$

$$HT = Max - pct*(Max-Min),$$

where pct=0.33, for example.

Figure 19A:
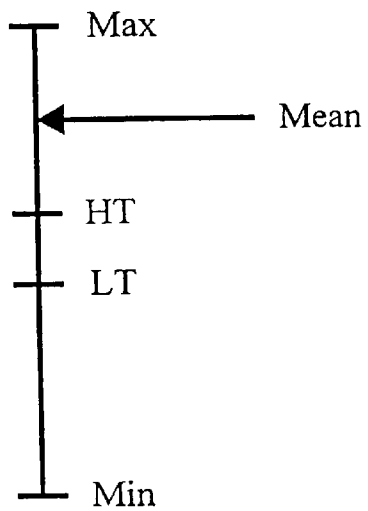
FIGS. 19A to 19C illustrate the process of pixel classification in the colour detection process of FIGS. 17A–17D.
Figure 19B:
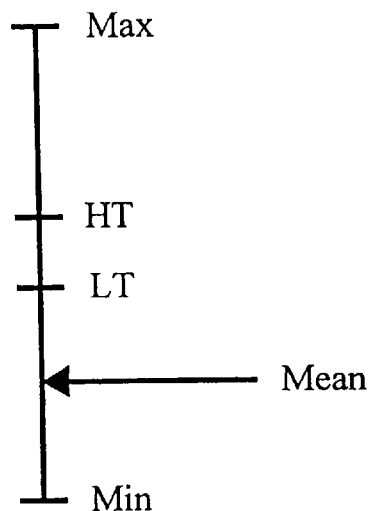
Figure 19C:
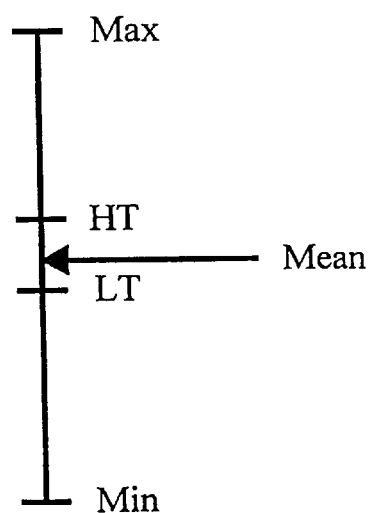

If the mean luminance of a representative window has a value in the range of HT to Max (i.e., case A) as shown in FIG. 19A, dark features are likely to be in the minority. In contrast, if the mean luminance has a value in the range of Min to LT (i.e., case B) as shown in FIG. 19A, bright features are likely to be in the minority. Otherwise, if the mean luminance has a value in the range of LT to HT (i.e., case C) as shown in FIG. 19C, dark and bright features are likely to be equally represented. Thus, at the end of the two first steps 1702 and 1704, four categories of pixels can be distinguished:

(i) undetermined pixels: pixels for which a reference window could not be chosen, or Min is equal to Max in the reference window;

(ii) case A: pixels belonging to an area where dark features are to be thickened;

(iii) case B: pixels belonging to an area where bright features are to be thickened; and (iv) case C: pixels belonging to an area where none of the features are to be thickened.

Figure 17C:
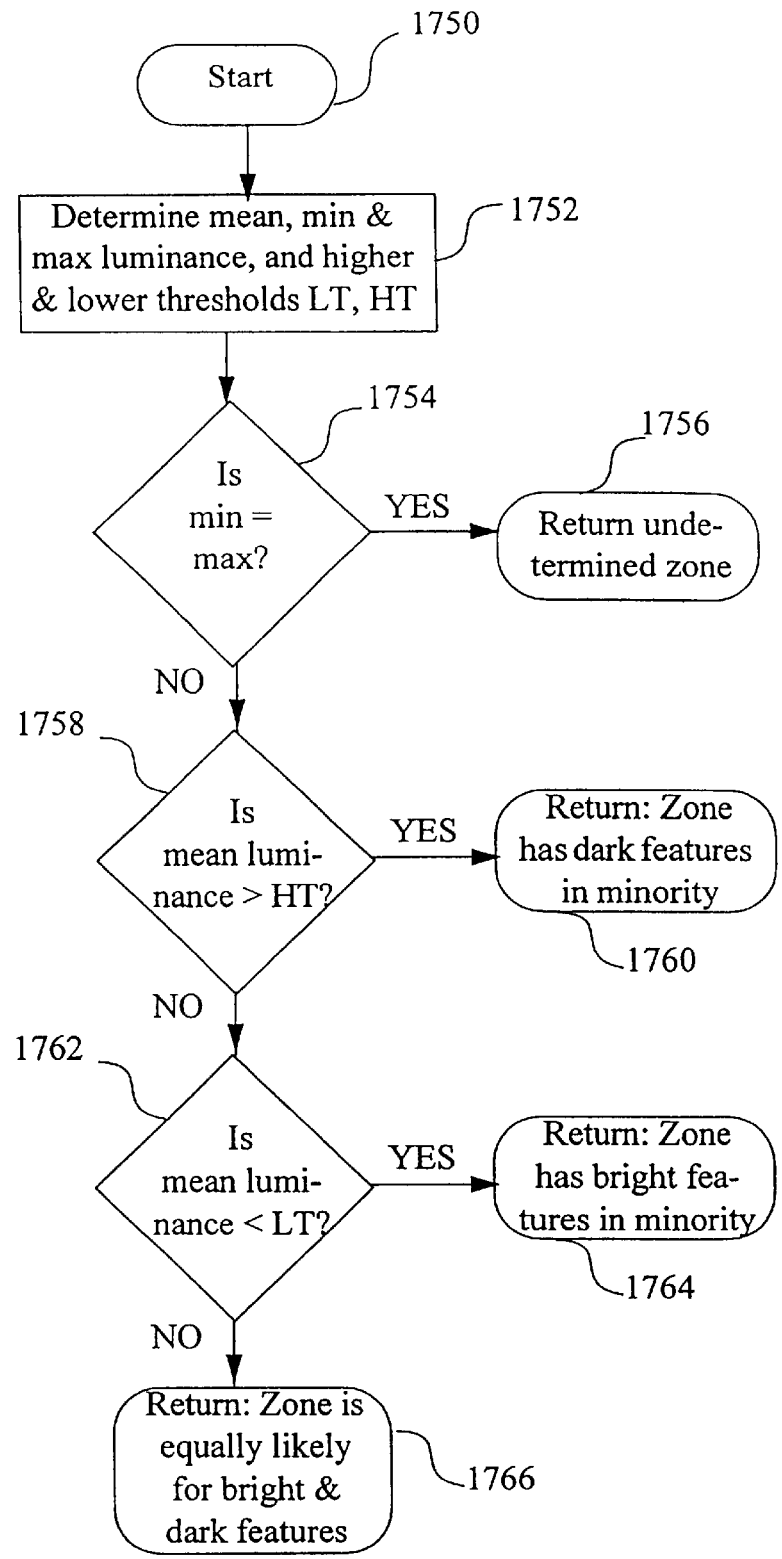

FIG. 17C is a flow diagram illustrating preferred substeps of step 1704 in greater detail. Processing commences in step 1750. In step 1752, the mean, Min and Max luminance and lower and higher threshold are determined for the reference window. In decision block 1764, a check is made to determine if the Min luminance equals the Max luminance. If decision block 1754 returns true (yes), processing continues at step 1756 and returns to the calling process. This is for the case where pixels are undetermined in terms of colour. Otherwise, if decision block 1754 returns false (no), processing continues at decision block 1758. In decision block 1758, a check is made to determine if the mean luminance of the window is greater than the higher luminance threshold. If decision block 1758 returns true (yes), processing continues at step 1760. In step 1760, the zone map is returned as having dark features in the minority.

Otherwise, if decision block 1758 returns false (no), processing continues at decision block 1762. In decision block 1762, a check is made to determine if the mean luminance is less than the lower luminance threshold. If decision block 1762 returns true (yes), processing continues at step 1764. In step 1764, the zone map is returned as having bright features in the minority. Otherwise, if decision block 1762 returns false (no), processing continues at step 1766. In step 1766, the zone map is returned as being equally likely to have dark and bright features.

For case A pixels, the smoothing method is applied as described in the second embodiment. For case B pixels, the smoothing method of the second embodiment is applied with all gradient signs being changed beforehand. For case C pixels, preferably, another smoothing method, which does not thicken any colour may be used, or no smoothing at all may be performed.

The next stage of the colour detection method comprises the step 1706 of smoothing the map obtained in step 1704. This last step 1706 aims at eliminating small regions, as well as affecting a label to undetermined pixels based on their neighbourhood (e.g., a 3×3 or 5×5 window).

Figure 17D:
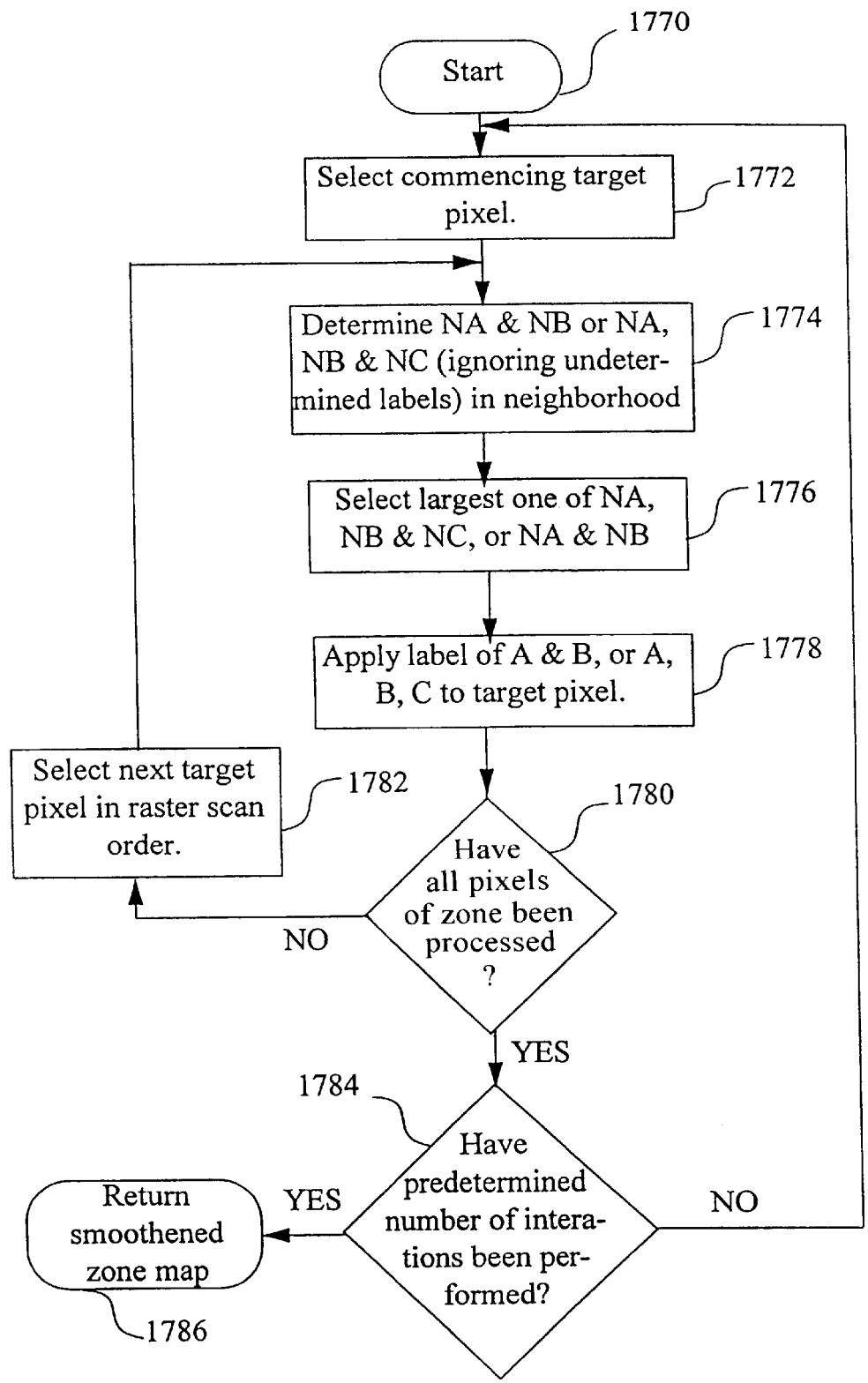

FIG. 17D is a flow diagram illustrating preferred substeps of step 1706 in greater detail. Processing of a zone map commences in step 1770. In step 1772, a first, commencing target pixel of the zone map is selected. In step 1774, the number NA and NB, or NA, NB and NC of labels (A, B, C) in the predetermined neighbourhood are determined (ignoring undetermined labels in the neighborhood). In step 1776, the largest one of NA, NB or NA, NB, NC is selected. In step 1778, the label of the largest number determined in step 1776 is applied to the target pixel. In decision block 1780, a check is made to determine if all of the pixels in the zone map have been processed. If decision block 1780 returns false (no), processing continues at step 1782. In step 1782, the next target pixel in raster scan order is selected for processing. Processing then continues at step 1774. Otherwise, if decision block 1780 returns true (yes), processing continues at decision block 1784. In decision block 1784, a check is made to determine if a predetermined number of iterations of this zone map smoothing processing have been carried out. If decision block 1784 returns false (no), processing continues at step 1772. Otherwise, if decision block 1784 returns true (yes), processing continues at step 1786 and the smoothened zone map is returned to the calling process.

Thus, the zone map obtained in step 1704 of FIG. 17A is scanned in raster order with each pixel being modified depending on its neighbours' label (i.e., A, B, C, or undetermined). If a label is predominant in the neighbourhood of a centre pixel, this predominant label is applied to the target pixel. The procedure is typically repeated a number of times. The "undetermined" label is not propagated, so that this category is progressively eliminated. The variables NA, NB and NC are the number of type A, B and C pixels, respectively, in the neighbourhood of the currently processed pixel. Two options for determining the new label of a target pixel are:

(1) the maximum value of NA, NB, and NC determines the new label of the centre pixel; and (2) the maximum value of NA, NB determines the new label of the centre pixel.

Choosing the second option instead of the first option reduces the number of pixels in category C, so that most features are thickened. A further option is to do first a few iterations with option (1) propagating labels A, B and C, and then a few iterations with option (2) propagating only labels A and B.

FIG. 15D shows the results obtained on the Japanese character image 1500 when colour detection is performed before smoothing, as described hereinbefore. The parameters for the colour detection method employed in this example are:

window selection:
  height=5,
  maximum width=25,
  minimum width 5; and map smoothing:
  5×3 neighbourhood,
  20 type 1 iterations
  followed by 5 type 2 iterations.

4. Combined Antialiasing and Thickening Process of Third Embodiment

The third embodiment of the invention takes advantage of both antialiasing and thickening algorithms by selectively applying either of them for each pixel. This combined method aims at thickening thin foreground features and antialiasing other jagged edges.

The colour detection method described hereinbefore performs zone segmentation which classifies each pixel into one of the three categories and a different smoothing method is applied to each of these categories. The three categories are:

A) areas where dark features are in a minority; the thickening method is applied to thicken dark oblique lines;

B) areas where bright features are in a minority; the thickening method is applied after all the gradient signs are changed to thicken bright oblique lines;

C) areas where dark and bright features are equally represented; the antialiasing method is applied to smooth any oblique edge without thickening any colour.

This combined process of the third embodiment allows thin foreground features to be thickened, except when they are too dense, which makes them more readable. This is the case especially after halftoning. Using the thickening method of the second embodiment when no colour is in a minority can affect dense text by connecting characters which should not be connected. Thus, it is preferable to use the antialiasing method for the third category.

Furthermore, to take advantage of the full potential of the combination of the antialiasing and thickening methods of the first and second embodiments, the output of both methods can be compared. The thickening method modifies only thin features (e.g., one XGA pixel-wide lines), and isolated edges are left unchanged. Therefore, wide characters located in type A or B area or zone is not smoothed. The antialiasing algorithm, on the other hand, smooths any jagged edge. Hence, there is a need to detect edges that are modified by the antialiasing process but not by the thickening process in zones A and B.

If an edge is antialiased, the difference between the antialiased image 2210 shown in FIG. 22B and original (or thickening processed) image 2200 shown in FIG. 22A illustrates alternate signs on a diagonal line 2222 of the difference map 2220 shown in FIG. 22C. Thus, a pixel belonging to zone A or B that should be antialiased is detected by comparing the sign of the difference between the antialiased and thickened images for the current pixel and its diagonal neighbours. If for one diagonal neighbour, the sign of the difference differs, the centre pixel is antialiased. Because of this comparison, all of the jagged edges are smoothed.

4.1 Flow Diagram of Process of Third Embodiment

Figure 21:
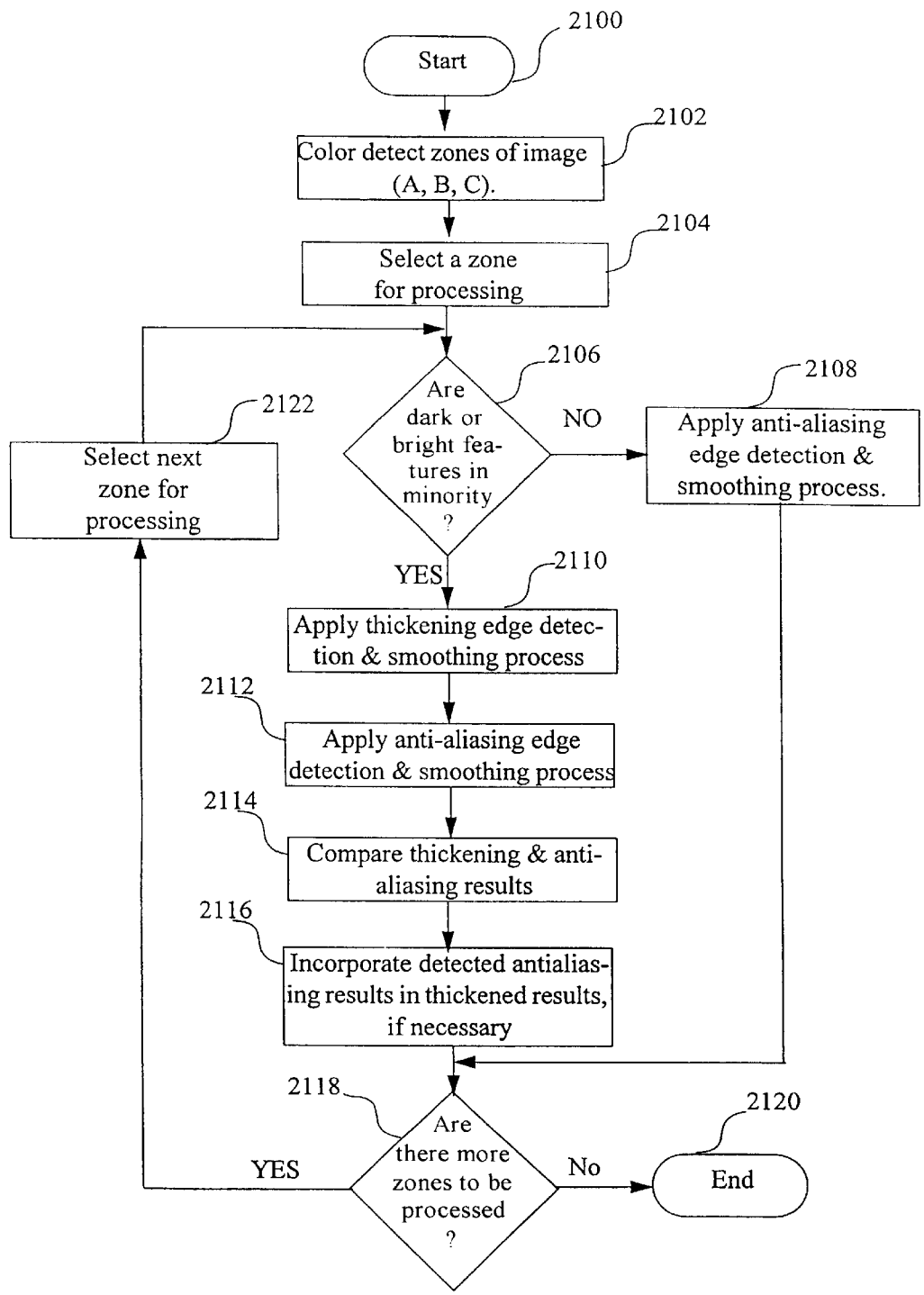
FIG. 21 is a flow diagram illustrating a combined anti-aliasing and thickening process in accordance with the third embodiment of the invention.

FIG. 21 is a flow diagram illustrating the combined antialiasing and thickening method of the third embodiment. Processing of the input data commences in step 2100. In step 2102, the colour detection process is applied to the image to detect zones A, B, C in the input data. This is done in accordance with the process described hereinbefore with reference to FIG. 17D. In step 2104, a first one of the detected zones is selected for processing. In decision block 2106, a check is made to determine if dark or bright features are in the minority in the selected zone. If decision block 2106 returns false (no) indicating a zone of type C, processing continues at step 2108. In step 2108, the antialiasing edge detection and smoothing processing of the first embodiment is applied to the zone. Processing then continues at decision block 2118.

Otherwise, if decision block 2106 returns true (yes) indicating a zone of type A or B, processing continues at step 2110. In step 2110, the thickening edge detection and smoothing process is applied to the selected zone. In step 2112, the antialiasing edge detection and smoothing processing of the first embodiment is also applied to the zone. In step 2114, the results of the antialiasing and thickening processing are compared dependent on the sign of differences between the antialiased and thickened results. In step 2116, detected antialiasing results for differences between the thickening and antialiasing results are incorporated in the thickening results. Processing then continues at decision block 2118.

In decision block 2118, a check is made to determine if there are more zones to be processed. If decision block 2118 returns true (yes), processing continues at step 2122. In step 2122, the next zone is selected, and processing continues at decision block 2106. Otherwise, if decision block 2118 returns false (no), processing terminates at step 2120.

The foregoing describes only a small number of embodiments of the present invention. Modifications and/or changes, obvious to one skilled in the art, can be made thereto without departing from the spirit and scope of the present invention.

What is claimed is:

1. A method of smoothing jagged edges of oblique lines or curves in a digital image, said method comprising the steps of:

detecting one or more edges of a selected pixel in the digital image, wherein a candidate edge of the selected pixel for detection is detected dependent upon intensities of the selected pixel and a further pixel abutting the candidate edge of the selected pixel, predetermined gradients of at least the selected pixel and the further pixel, and predetermined gradients of one or more pixels diagonally adjacent the selected pixel; and modifying the selected pixel by applying a convolution mask to the selected pixel and a predetermined neighbourhood of pixels containing the selected pixel so as to smooth oblique edges without blurring horizontal or vertical edges, wherein coefficient values of the convolution mask are dependent upon the one or more detected edges.

2. The method according to claim 1, wherein the detecting step is dependent upon a difference between the intensities of the selected pixel and the further pixel satisfying an intensity threshold.

3. The method according to claim 2, wherein the detecting step is dependent upon an absolute value of the difference exceeding the intensity threshold.

4. The method according to claim 1, wherein the detecting step is dependent upon the predetermined gradients of the selected pixel and the further pixel satisfying a gradient threshold.

5. The method according to claim 4, wherein the predetermined gradients of the selected pixel and the further pixel are either vertical or horizontal dependent upon the candidate edge being either horizontal or vertical, respectively.

6. The method according to claim 4, wherein the predetermined gradients of the selected pixel and the further pixel are greater than the gradient threshold.

7. The method according to claim 4, wherein the predetermined gradients of the selected pixel and the further pixel are less than the gradient threshold.

8. The method according to claim 1, wherein the detecting step is dependent upon the predetermined gradients of the diagonal pixels satisfying a gradient threshold.

9. The method according to claim 8, wherein:

the predetermined gradients of the selected pixel and the further pixel are greater than the gradient threshold; and the predetermined gradients of the diagonal pixels are less than the gradient threshold.

10. The method according to claim 8, wherein:
the predetermined gradients of the selected pixel and the further pixel are less than the gradient threshold; and
the predetermined gradients of the diagonal pixels are greater than the gradient threshold.

11. The method according to claim 1, wherein if a single edge is detected, one or more coefficient values of a portion of the convolution mask next to the detected single edge are set to a predetermined value.

12. The method according to claim 11, wherein the predetermined value is zero.

13. The method according to claim 1, wherein if a double edge is detected, one or more coefficient values of each portion of the convolution mask next to the detected double edge are set to a predetermined value.

14. The method according to claim 13, wherein the predetermined value is zero.

15. The method according to claim 6 or 7, wherein the detecting step comprises the sub-steps of:
a first detecting sub-step, of detecting a double edge, wherein the candidate double edge is detected dependent upon the intensities of the selected pixel and two further pixels abutting the candidate double edge, predetermined gradients of at least the selected pixel and the two further pixels abutting the candidate edge; and
a second detecting sub-step, of detecting a double edge detected by the first detecting sub-step that belongs to a thickening pixel, wherein a detected double edge that belongs to a thickening pixel is dependent upon a horizontal and vertical gradient of a diagonal pixel adjacent the selected pixel at the junction of the two edges of the detected double edge.

16. The method according to claim 15, wherein one or more coefficient values of a portion of the convolution mask corresponding to each edge opposite to the detected double edge that belong to a thickening pixel are set to a predetermined value.

17. The method according to claim 1, wherein said detecting step is carried out for each colour component of the selected pixel, and the one or more detected edges are dependent upon the largest intensity and gradient values of the colour components.

18. The method according to claim 1, wherein said detecting step comprises the sub-step of:
determining a candidate edge of the selected pixel as a detected edge if the intensities of the selected pixel and the further pixel are substantially different, the predetermined gradients of the selected and further pixels are both an absolute local maxima, and the predetermined gradients of the one or more diagonal pixels are not an absolute local maxima of the same sign as that of neighbouring pixels.

19. The method according to claim 18, further comprising the steps of:
comparing a modified value of the selected pixel with an original value of the selected pixel;
restoring the selected pixel to its original value dependent upon a number of modified values of the digital image.

20. The method according to claim 18, further comprising the steps of:
determining the number of modified pixels in a predetermined neighbourhood of pixels containing the selected pixel; and
if the number exceeds a threshold number of modified pixels, restoring one or more modified pixels in the neighbourhood to the original value of the respective pixel.

21. The method according to claim 18, further comprising the steps of:
determining if modified pixels in a predetermined neighbourhood of pixels containing the selected pixel conform to a predetermined pattern of pixels; and
restoring any pixels determined not to conform to the predetermined pattern to the original value of the respective pixel.

22. The method according to claim 18, further comprising the steps of:
determining the number of modified pixels in a predetermined neighbourhood of pixels containing the selected pixel having increased values;
determining the number of modified pixels in a predetermined neighbourhood of pixels containing the selected pixel having decreased values; and
restoring the original value of the selected pixel if the number of increased-value modified pixels is not substantially the same as the number of decreased-value modified pixels.

23. The method according to claim 1, wherein said detecting step comprises the sub-step of:
determining a double edge if the intensities of the selected pixel and and two further pixels abutting the selected pixel are substantially different, and the predetermined gradients of the selected pixel and two further pixels are an absolute local maxima.

24. The method according to claim 23, wherein said detecting step further comprises the sub-steps of:
determining if the selected pixel is a thickening pixel; and
setting to zero one or more coefficient values of a portion of said mask corresponding to an edge opposite to each edge of a said determined double edge associated with the determined thickening pixel.

25. The method according to claim 24, wherein the selected pixel is determined to be a thickening pixel if the horizontal and vertical gradients of a pixel at the junction of the two edges of the determined double edge and diagonally abutting the selected pixel are absolute local minima.

26. The method according to claim 25, further comprising the steps of:
determining if pixels in a predetermined size neighbourhood of the selected pixel are also candidates for thickening; and
if the neighbouring pixels are also thickening candidates, restoring the selected pixel to its original value.

27. The method according to claim 23, further comprising the steps of:
determining a zone containing the neighbourhood of pixels; and
if the zone is an inverted zone having a dark background colour and a bright foreground colour, negating said predetermined gradients of the selected and neighbouring pixels.

28. The method according to claim 27, wherein said step of determining a zone comprises the further steps of:
choosing a representative window for the selected pixel;
comparing local statistics regarding luminance of pixels in the representative window to obtain a zone; and
smoothing the zone.

29. An apparatus for smoothing jagged edges of oblique lines or curves in a digital image, said apparatus comprising:
means for detecting one or more edges of a selected pixel in the digital image, wherein a candidate edge of the selected pixel for detection is detected dependent upon intensities of the selected pixel and a further pixel abutting the candidate edge of the selected pixel, predetermined gradients of at least the selected pixel and the further pixel, and predetermined gradients of one or more pixels diagonally adjacent the selected pixel; and means for modifying the selected pixel by applying a convolution mask to the selected pixel and a predetermined neighbourhood of pixels containing the selected pixel so as to smooth oblique edges without blurring horizontal or vertical edges, wherein coefficient values of the convolution mask are dependent upon the one or more detected edges.

30. The apparatus according to claim 29, wherein the detecting operation of said detection means is dependent upon a difference between the intensities of the selected pixel and the further pixel satisfying an intensity threshold.

31. The apparatus according to claim 30, wherein the detecting operation of the detection means is dependent upon an absolute value of the difference exceeding said intensity threshold.

32. The apparatus according to claim 29, wherein the detecting operation of said detection means is dependent upon the predetermined gradients of the selected pixel and the further pixel satisfying a gradient threshold.

33. The apparatus according to claim 32, wherein the predetermined gradients of the selected pixel and the further pixel are either vertical or horizontal dependent upon the candidate edge being either horizontal or vertical, respectively.

34. The apparatus according to claim 32, wherein the predetermined gradients of the selected pixel and the further pixel are greater than said gradient threshold.

35. The apparatus according to claim 32, wherein the predetermined gradients of the selected pixel and the further pixel are less than said gradient threshold.

36. The apparatus according to claim 32, wherein the detecting operation of said detection means is dependent upon the predetermined gradients of the diagonal pixels satisfying a gradient threshold.

37. The apparatus according to claim 36, wherein:
the predetermined gradients of the selected pixel and the further pixel are greater than said gradient threshold; and
the predetermined gradients of the diagonal pixels are less than said gradient threshold.

38. The apparatus according to claim 36, wherein:
the predetermined gradients of the selected pixel and the further pixel are less than said gradient threshold; and
the predetermined gradients of the diagonal pixels are greater than said gradient threshold.

39. The apparatus according to claim 29, wherein if a single edge is detected, one or more coefficient values of a portion of said convolution mask next to the detected single edge are set to a predetermined value.

40. The apparatus according to claim 39, wherein said predetermined value is zero.

41. The apparatus according to claim 29, wherein if a double edge is detected, one or more coefficient values of each portion of said convolution mask next to the detected double edge are set to a predetermined value.

42. The apparatus according to claim 41, wherein said predetermined value is zero.

43. The apparatus according to claim 34 or 35, wherein the detection means comprises:
a first detecting sub-module for detecting a double edge, wherein the candidate double edge is detected dependent upon the intensities of the selected pixel and two further pixels abutting the candidate double edge, predetermined gradients of at least the selected pixel and the two further pixels abutting the candidate edge; and
a second detecting sub-module for detecting a double edge detected by the first detecting sub-module that belongs to a thickening pixel, wherein a detected double edge that belongs to a thickening pixel is dependent upon a horizontal and vertical gradient of a diagonal pixel adjacent the selected pixel at the junction of the two edges of the detected double edge.

44. The apparatus according to claim 43, wherein one or more coefficient values of a portion of said convolution mask corresponding to each edge opposite to the detected double edge that belongs to a thickening pixel is set to a predetermined value.

45. The apparatus according to claim 29, wherein the detecting operation of said detection means is carried out for each colour component of the selected pixel, and the one or more detected edges are dependent upon the largest intensity and gradient values of the colour components.

46. The apparatus according to claim 29, wherein said detection means comprises:
means for determining a candidate edge of the selected pixel as a detected edge if the intensities of the selected pixel and the further pixel are substantially different, the predetermined gradients of the selected and further pixels are both an absolute local maxima, and the predetermined gradients of the one or more diagonal pixels are not an absolute local maxima of the same sign as that of neighbouring pixels.

47. The apparatus according to claim 46, further comprising:
means for comparing a modified value of the selected pixel with the original value of the selected pixel;
means for restoring the selected pixel to its original value dependent upon a number of modified values of the digital image.

48. The apparatus according to claim 46, further comprising:
means for determining the number of modified pixels in a predetermined neighbourhood of pixels containing the selected pixel; and
means for, if the number exceeds a threshold number of modified pixels, restoring one or more modified pixels in the neighbourhood to the original value of the respective pixel.

49. The apparatus according to claim 46, further comprising:
means for determining if modified pixels in a predetermined neighbourhood of pixels containing the selected pixel conform to a predetermined pattern of pixels; and
means for restoring any pixels determined not to conform to the predetermined pattern to the original value of the respective pixel.

50. The apparatus according to claim 46, further comprising:
means for determining the number of modified pixels in a predetermined neighbourhood of pixels containing the selected pixel having increased values;
means for determining the number of modified pixels in a predetermined neighbourhood of pixels containing the selected pixel having decreased values; and
means for restoring the original value of the selected pixel if the number of increased-value modified pixels is not substantially the same as the number of decreased-value modified pixels.

51. The apparatus according to claim 29, wherein said detection means comprises:
   means for determining a double edge if the intensities of the selected pixel and two further pixels abutting the selected pixel are substantially different, and the predetermined gradients of the selected pixel and two further pixels are absolute local maxima.

52. The apparatus according to claim 51, wherein said detection means further comprises:
   means for determining if the selected pixel is a thickening pixel; and
   means for setting to zero one or more coefficient values of a portion of said mask corresponding to an edge opposite to each edge of a said determined double edge associated with the determined thickening pixel.

53. The apparatus according to claim 52, wherein said selected pixel is determined to be a thickening pixel if the selected pixel has two edges and if the horizontal and vertical gradients of a pixel at the junction of the two edges of the determined double edge and diagonally abutting the selected pixel are absolute local minima.

54. The apparatus according to claim 53, further comprising:
   means for determining if pixels in a predetermined size neighbourhood of the selected pixel are also candidates for thickening; and
   means for, if the neighbouring pixels are also thickening candidates, restoring the selected pixel to its original value.

55. The apparatus according to claim 51, further comprising:
   means for determining a zone containing the neighbourhood of pixels; and
   means for, if the zone is an inverted zone having a dark background colour and a bright foreground colour, negating the predetermined gradients of the selected and neighbouring pixels.

56. The apparatus according to claim 55, wherein said means for determining a zone comprises:
   means for choosing a representative window for the selected pixel;
   means for comparing local statistics regarding luminance of pixels in the representative window to obtain a zone; and
   means for smoothing the zone.

57. A computer program product including a computer readable medium having recorded thereon a computer program for smoothing jagged edges of oblique lines or curves in a digital image, said computer program product comprising:
   means for detecting one or more edges of a selected pixel in the digital image, wherein a candidate edge of the selected pixel for detection is detected dependent upon intensities of the selected pixel and a further pixel abutting the candidate edge of the selected pixel, predetermined gradients of at least the selected pixel and the further pixel, and predetermined gradients of one or more pixels diagonally adjacent the selected pixel; and
   means for modifying the selected pixel by applying a convolution mask to the selected pixel and a predetermined neighbourhood of pixels containing the selected pixel so as to smooth oblique edges without blurring horizontal or vertical edges, wherein coefficient values of the convolution mask are dependent upon the one or more detected edges.

58. The computer program product according to claim 57, wherein the detecting operation of the detection means is dependent upon a difference between the intensities of the selected pixel and the further pixel satisfying an intensity threshold.

59. The computer program product according to claim 58, wherein the detecting operation of the detection means is dependent upon an absolute value of the difference exceeding said intensity threshold.

60. The computer program product according to claim 57, wherein the detecting operation of the detection means is dependent upon the predetermined gradients of the selected pixel and the further pixel satisfying a gradient threshold.

61. The computer program product according to claim 60, wherein the predetermined gradients of the selected pixel and the further pixel are either vertical or horizontal dependent upon the candidate edge being either horizontal or vertical, respectively.

62. The computer program product according to claim 60, wherein the predetermined gradients of the selected pixel and the further pixel are greater than said gradient threshold.

63. The computer program product according to claim 60, wherein the predetermined gradients of the selected pixel and the further pixel are less than said gradient threshold.

64. The computer program product according to claim 60, wherein the detecting operation of the detection means is dependent upon the predetermined gradients of the diagonal pixels satisfying a gradient threshold.

65. The computer program product according to claim 64, wherein:
   the predetermined gradients of the selected pixel and the further pixel are greater than said gradient threshold; and
   the predetermined gradients of the diagonal pixels are less than said gradient threshold.

66. The computer program product according to claim 64, wherein:
   the predetermined gradients of the selected pixel and the further pixel are less than said gradient threshold; and
   the predetermined gradients of the diagonal pixels are greater than said gradient threshold.

67. The computer program product according to claim 57, wherein if a single edge is detected, one or more coefficient values of a portion of said next to the detected single edge are set to a predetermined value.

68. The computer program product according to clam 67, wherein said predetermined value is zero.

69. The computer program product according to claim 57, wherein if a double edge is detected, one or more coefficient values of each portion of said convolution mask next to the detected double edge are set to a predetermined value.

70. The computer program product according to claim 69, wherein said predetermined value is zero.

71. The computer program product according to claim 62 or 63, wherein the detection means comprises:
   a first detecting sub-module for detecting a double edge, wherein the candidate double edge is detected dependent upon the intensities of the selected pixel and two further pixels abutting the candidate double edge, predetermined gradients of at least the selected pixel and the two further pixels abutting the candidate edge; and
   a second detecting sub-module for detecting a double edge detected by the first detecting sub-module that belongs to a thickening pixel, wherein a detected double edge that belongs to a thickening pixel is dependent upon a horizontal and vertical gradient of a diagonal pixel adjacent the selected pixel at the junction of the two edges of the detected double edge.

72. The computer program product according to claim 71, wherein one or more coefficient values of a portion of said convolution mask corresponding to each edge opposite to the detected double edge that belongs to a thickening pixel are set to a predetermined value.

73. The computer program product according to claim 57, wherein the detecting operation of said detection means is carried out for each colour component of the selected pixel, and the one or more detected edges are dependent upon the largest intensity and gradient values of the colour components.

74. The computer program product according to claim 57, wherein said detection means comprises:

means for determining a candidate edge of the selected pixel as a detected edge if the intensities of the selected pixel and the further are substantially different, the predetermined gradients of the selected and further pixels are both an absolute local maxima, and the predetermined gradients of the one or more diagonal pixels are not an absolute local maxima of the same sign as that of neighbouring pixels.

75. The computer program product according to claim 74, further comprising:

means for comparing a modified value of the selected pixel with the original value of the selected pixel;

means for restoring the selected pixel to its original value dependent upon a number of modified values of the digital image.

76. The computer program product according to claim 74, further comprising:

means for determining the number of modified pixels in a predetermined neighbourhood of pixels containing the selected pixel; and means for, if said number exceeds a threshold number of modified pixels, restoring one or more modified pixels in said neighbourhood to the original value of the respective pixel.

77. The computer program product according to claim 74, further comprising:

means for determining if modified pixels in a predetermined neighbourhood of pixels containing the selected pixel conform to a predetermined pattern of pixels; and means for restoring any pixels determined not to conform to the predetermined pattern to the original value of the respective pixel.

78. The computer program product according to claim 74, further comprising:

means for determining the number of modified pixels in a predetermined neighbourhood of pixels containing the selected pixel having increased values;

means for determining the number of modified pixels in a predetermined neighbourhood of pixels containing the selected pixel having decreased values; and means for restoring the original value of the selected pixel if the number of increased-value modified pixels is not substantially the same as the number of decreased-value modified pixels.

79. The computer program product according to claim 57, wherein said detection means comprises:

means for determining a double edge if the intensities of the selected pixel and and two further pixels abutting the selected pixel are substantially different, and the predetermined gradients of the selected pixel and two further pixels are absolute local maxima.

80. The computer program product according to claim 79, wherein said detection means further comprises:

means for determining if the selected pixel is a thickening pixel; and means for setting to zero one or more coefficient values of a portion of said mask corresponding to an edge opposite to each edge of a said determined double edge associated with the determined thickening pixel.

81. The computer program product according to claim 80, wherein the selected pixel is determined to be a thickening pixel if the selected pixel has two edges and if the horizontal and vertical gradients of a pixel at the junction of the two edges of the determined double edge and diagonally abutting the selected pixel are absolute local minima.

82. The computer program product according to claim 81, further comprising:

means for determining if pixels in a predetermined size neighbourhood of the selected pixel are also candidates for thickening; and means for, if the neighbouring pixels are also thickening candidates, restoring the selected pixel to its original value.

83. The computer program product according to claim 79, further comprising:

means for determining a zone containing the neighbourhood of pixels; and means for, if the zone is an inverted zone having a dark background colour and a bright foreground colour, negating said predetermined gradients of the selected and neighbouring pixels.

84. The computer program product according to claim 83, wherein said means for determining a zone comprises:

means for choosing a representative window for the selected pixel;

means for comparing local statistics regarding luminance of pixels in the representative window to obtain a zone; and means for smoothing the zone.

* * * * *

UNITED STATES PATENT AND TRADEMARK OFFICE
CERTIFICATE OF CORRECTION

PATENT NO. : 6,608,942 B1
DATED : August 19, 2003
INVENTOR(S) : Delphine Anh Dao Le It is certified that error appears in the above-identified patent and that said Letters Patent is hereby corrected as shown below:

Title page,
Item [57], ABSTRACT,
Line 4, "edge" should read -- edges --.

Drawings,
Figure 17D, "intera-" should read -- itera- --.

Column 1,
Line 38, "(eg.," should read -- (e.g., --; and
Line 65, "(ie." should read -- (i.e. --.

Column 4,
Line 64, "an" should read -- and --.

Column 6,
Lines 45 and 46, "(eg." should read -- (e.g. --;
Line 56, "(ie." should read -- (i.e. --.

Column 8,
Line 59, "characterised" should read -- characterized --.

Column 9,
Line 6, "(ie," should read -- (i.e., --.

Column 10,
Line 10, "(ie," should read -- (i.e., --; and
Line 27, "C" should read -- C) --.

Column 11,
Line 16, "Generalised" should read -- Generalized --; and
Lines 18 and 30, "generalised" should read -- generalized --.

Column 12,
Line 17, "generalised" should read -- generalized --.

Column 13,
Line 20, "normalised" should read -- normalized --; and "normalisation" should read -- normalization --.

UNITED STATES PATENT AND TRADEMARK OFFICE
CERTIFICATE OF CORRECTION

PATENT NO.     : 6,608,942 B1
DATED          : August 19, 2003
INVENTOR(S)    : Delphine Anh Dao Le It is certified that error appears in the above-identified patent and that said Letters Patent is hereby corrected as shown below:

Column 14,
Line 22, "normalisation" should read --normalization --; and
Line 57, "generalised" should read -- generalized --.

Column 18,
Line 34, "generalised" should read -- generalized --.

Column 20,
Line 63, "generalised" should read -- generalized --.

Column 24,
Line 43, "(ie.," should read -- (i.e., --; and
Line 54, "minimise" should read -- minimize --.

Column 25,
Lines 20, 25 and 51, "(ie.," should read -- (i.e., --;
Line 55, "characterising" should read -- characterizing --; and
Line 59, "generalised" should read -- generalized --.

Column 31,
Line 55, "pixel;" should read -- pixel; and --.

Column 32,
Line 25, "and" (second occurrence) should be deleted.

Column 34,
Line 35, "pixel;" should read -- pixel; and --.

Column 36,
Line 27, "claim 60," should read -- claim 57, --;
Line 46, "said" should read -- said convolution mask --.

UNITED STATES PATENT AND TRADEMARK OFFICE
CERTIFICATE OF CORRECTION

PATENT NO. : 6,608,942 B1
DATED : August 19, 2003
INVENTOR(S) : Delphine Anh Dao Le It is certified that error appears in the above-identified patent and that said Letters Patent is hereby corrected as shown below:

Column 37,
Line 20, "further" should read -- further pixel --.

Column 38,
Line 11, "and" (second occurrence) should be deleted.

Signed and Sealed this

Twenty-second Day of June, 2004

JON W. DUDAS
*Acting Director of the United States Patent and Trademark Office*